(12) United States Patent
Ogane

(10) Patent No.: US 8,273,677 B2
(45) Date of Patent: Sep. 25, 2012

(54) PRODUCTION PROCESS OF PRE-POLYMERIZED POLYMERIZATION CATALYST COMPONENT AND ADDITION POLYMER

(75) Inventor: Takuya Ogane, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 11 days.

(21) Appl. No.: 13/071,014

(22) Filed: Mar. 24, 2011

(65) Prior Publication Data

US 2011/0245438 A1 Oct. 6, 2011

(30) Foreign Application Priority Data

Mar. 31, 2010 (JP) ................................ 2010-081666

(51) Int. Cl.
| | |
|---|---|
| C08F 4/6192 | (2006.01) |
| C08F 4/6592 | (2006.01) |
| C08F 4/60 | (2006.01) |
| C08F 4/603 | (2006.01) |
| C08F 4/02 | (2006.01) |
| B01J 31/22 | (2006.01) |

(52) U.S. Cl. ........ 502/109; 502/103; 502/104; 502/120; 502/129; 502/132; 502/152; 526/129; 526/160; 526/943

(58) Field of Classification Search .................. 502/103, 502/104, 109, 120, 129, 132, 152; 526/129, 526/160, 943

See application file for complete search history.

(56) References Cited

U.S. PATENT DOCUMENTS

| | | | |
|---|---|---|---|
| 2003/0060579 A1 | 3/2003 | Oshima et al. | |
| 2009/0227746 A1* | 9/2009 | Hatakeyama et al. | .......... 526/92 |
| 2010/0280197 A1 | 11/2010 | Takaoki et al. | |

FOREIGN PATENT DOCUMENTS

| | | |
|---|---|---|
| JP | 2003-171413 A | 6/2003 |
| JP | 2006-233115 A | 9/2006 |
| JP | 2009-256661 A | 11/2009 |

* cited by examiner

*Primary Examiner* — Caixia Lu
(74) *Attorney, Agent, or Firm* — Panitch Schwarze Belisario & Nadel LLP

(57) ABSTRACT

A production process of a pre-polymerized catalyst component, comprising steps of (i) contacting a transition metal compound defined by formula [1], an activation agent, an organometallic compound defined by formula [2], and an optional organoaluminum compound with one another, thereby forming a primary polymerization catalyst, and (ii) pre-polymerizing an olefin in the presence of the primary polymerization catalyst; and a process for producing an addition polymer, comprising a step of polymerizing an addition polymerizable monomer in the presence of a pre-polymerized catalyst component produced by the above production process, or in the presence of the pre-polymerized catalyst component and an organoaluminum compound.

8 Claims, No Drawings

US 8,273,677 B2

PRODUCTION PROCESS OF PRE-POLYMERIZED POLYMERIZATION CATALYST COMPONENT AND ADDITION POLYMER

FIELD OF THE INVENTION

The present invention relates to a process for producing a pre-polymerized catalyst component for addition polymerization, and a process for producing an addition polymer.

BACKGROUND OF THE INVENTION

It is known in the art to use a specific particle as one of polymerization catalyst components to produce a particulate polymer having a uniform particle shape, in order to inhibit adherence of the particulate polymer in production to a polymerization reactor. Such adherence, which is called "fouling" in the art, tends to occur when producing a particulate polymer by polymerizing an addition-polymerizable monomer such as an olefin by a slurry, gas-phase or bulk polymerization method, with the use of a polymerization catalyst formed from a combination of a transition metal catalyst component (for example, a metallocene complex and a non-metallocene compound) with an organometallic catalyst component such as aluminoxane. Such fouling is particularly tremendous in pre-polymerization of an olefin with the use of such a polymerization catalyst.

For example, JP 2003-171413A discloses a pre-polymerization method of an olefin, comprising steps of (i) modifying silica gel particles with the combined use of an organozinc compound, trifluorophenol and water, thereby obtaining modified silica gel particles, and (ii) pre-polymerizing an olefin in the presence of a primary polymerization catalyst formed by the combined use of the above modified silica gel particles, a transition metal compound and an organoaluminum compound.

Also, JP 2006-233115A discloses a production method of a pre-polymerized catalyst component for addition polymerization, comprising steps of (i) contacting a transition metal compound with modified particles, thereby obtaining a primary polymerization catalyst, and (ii) pre-polymerizing an olefin in the presence of the above primary polymerization catalyst; a production method of a pre-polymerized catalyst for addition polymerization; and a production method of an addition polymer with the use of the above pre-polymerized catalyst, wherein the transition metal compound in above step (i) is used in a powdery state, or in a slurry state.

SUMMARY OF THE INVENTION

However, the above conventional pre-polymerization sometimes makes fouling, which is not sufficiently satisfactory from a viewpoint of a safe operation of production facilities, and a productivity of an addition polymer. The present invention has an object to provide (i) a process for producing a pre-polymerized catalyst component for addition polymerization, which can prevent the above-mentioned fouling, and (ii) a process for producing an addition polymer with the use of a pre-polymerized catalyst component produced by such a production process.

The present invention is a process for producing a pre-polymerized catalyst component for addition polymerization, comprising steps of:

(1) contacting a transition metal compound represented by following formula [1], or a µ-oxo type dimmer of the transition metal compound, an activation agent, an organometallic compound represented by following formula [2], and an optional organoaluminum compound with one another; thereby forming a primary polymerization catalyst; and (2) pre-polymerizing an olefin in the presence of the primary polymerization catalyst;

  [1]

wherein $M^1$ is a transition metal atom of group 4 in the periodic table; $L^1$ is a cyclopentadiene-containing anionic group or a hetero atom-containing group, and when two $L^1$s exsist, they may be linked to each other, directly or through a linking group containing a carbon, silicon, nitrogen, oxygen, sulfur or phosphorus atom; $X^1$ is a halogen atom, a hydrocarbyloxy group, or a hydrocarbyl group other than the above cyclopentadiene-containing anionic group; a is a number satisfying $0<a\leqq3$; and b is a number satisfying $0<b\leqq3$;

  [2]

wherein $M^2$ is a typical metal atom of group 1 or 2 in the periodic table; $L^2$ is a hydrogen atom, a halogen atom, a hydrocarbyl group, or a hydrocarbyloxy group; and m is a valence of $M^2$. The above "primary polymerization catalyst" is referred to hereinafter as "primary catalyst", and this process is referred to hereinafter as "catalyst component production process".

Also, the present invention is a process for producing an addition polymer, comprising a step of polymerizing an addition polymerizable monomer in the presence of a pre-polymerized catalyst component for addition polymerization produced by the above catalyst component production process, or in the presence of the pre-polymerized catalyst component and an organoaluminum compound. This process is referred to hereinafter as "polymer production process".

The above term "pre-polymerization" means preliminary polymerization, and is used in contrast to polymerization carried out in a process for producing an addition polymer with the use of a pre-polymerized catalyst component. Therefore, polymerization carried out in the polymer production process of the present invention may be referred to as "main polymerization".

DETAILED DESCRIPTION OF THE INVENTION

Transition Metal Compound and µ-Oxo Type Dimmer Thereof

The transition metal compound or a µ-oxo type dimmer thereof in the present invention is not particularly restricted in its kind, as long as a combined use thereof with an activating agent and an optional organoaluminium compound exhibits a polymerization activity. The transition metal compound in the present invention is usually a metallocene complex. A polymerization catalyst using such a transition metal compound is distinguished from a conventional solid polymerization catalyst using titanium trichloride or titanium tetrachloride, which is usually referred to as a Ziegler-Natta catalyst.

Examples of $M^1$ in formula [1] are a titanium atom, a zirconium atom and a hafnium atom. Among them, preferred is a zirconium atom.

Examples of the cyclopentadiene-containing anionic group of $L^1$ in formula [1] are a (substituted) cyclopentadienyl group, a (substituted) indenyl group, and a (substituted) fluorenyl group. Specific examples thereof are a cyclopentadienyl group, a methylcyclopentadienyl group, an ethylcyclopentadienyl group, a n-butylcyclopentadienyl group, a tert-butylcyclopentadienyl group, a 1,2-dimethylcyclopentadienyl group, a 1,3-dimethylcyclopentadienyl group, a 1-methyl-2-ethylcyclopentadienyl group, a 1-methyl-3-ethylcyclopentadienyl group, a 1-tert-butyl-2-methyl-cyclopentadienyl group, a 1-tert-butyl-3-methylcyclopentadienyl group, a 1-methyl-2-isopropylcyclopentadienyl group, a 1-methyl-3-isopropylcyclopentadienyl group, a 1-methyl-2-n-butylcyclopentadienyl group, a 1-methyl-3-n-butylcyclopentadienyl group, a $\eta^5$-1,2,3-trimethylcyclopentadienyl group, a $\eta^5$-1,2,4-trimethylcyclopentadienyl group, a tetramethylcyclopentadienyl group, a pentamethylcyclopentadienyl group, an indenyl group, a 4,5,6,7-tetrahydroindenyl group, a 2-methylindenyl group, a 3-methylindenyl group, a 4-methylindenyl group, a 5-methylindenyl group, a 6-methylindenyl group, a 7-methylindenyl group, a 2-tert-butylindenyl group, a 3-tert-butylindenyl group, a 4-tert-butylindenyl group, a 5-tert-butylindenyl group, a 6-tert-butylindenyl group, a 7-tert-butylindenyl group, a 2,3-dimethylindenyl group, a 4,7-dimethylindenyl group, a 2,4,7-trimethylindenyl group, a 2-methyl-4-isopropylindenyl group, a 4,5-benzindenyl group, a 2-methyl-4,5-benzindenyl group, a 4-phenylindenyl group, a 2-methyl-5-phenylindenyl group, a 2-methyl-4-phenylindenyl group, a 2-methyl-4-naphthylindenyl group, a fluorenyl group, a 2,7-dimethylfluorenyl group, and a 2,7-di-tert-butylfluorenyl group.

The multidentate $\eta$ of the cyclopentadiene-containing anionic group of $L^1$ in formula [1] is not particularly limited. Examples of the multidentate value are 5, 4, 3, 2 and 1. Among them, preferred is 5, 3 or 1, and more preferred is 5 or 3.

Examples of the hetero atom in the hetero atom-containing group of $L^1$ in formula [1] are an oxygen atom, a sulfur atom, a nitrogen atom and a phosphorus atom. The hetero atom-containing group is preferably an alkoxy group; an aryloxy group; a thioalkoxy group; a thioaryloxy group; an alkylamino group; an arylamino group; an alkylphosphino group; an arylphosphino group; a chelating ligand; an aromatic heterocyclic group having an oxygen atom, a sulfur atom, a nitrogen atom or a phosphorus atom in its ring; or an aliphatic heterocyclic group having an oxygen atom, a sulfur atom, a nitrogen atom or a phosphorus atom in its ring.

Examples of the hetero atom-containing group are a methoxy group, an ethoxy group, a propoxy group, a butoxy group, a phenoxy group, a 2-methylphenoxy group, a 2,6-dimethylphenoxy group, a 2,4,6-trimethylphenoxy group, a 2-ethylphenoxy group, a 4-n-propylphenoxy group, a 2-isopropylphenoxy group, a 2,6-diisopropylphenoxy group, a 4-sec-butylphenoxy group, a 4-tert-butylphenoxy group, a 2,6-di-sec-butylphenoxy group, a 2-tert-butyl-4-methylphenoxy group, a 2,6-di-tert-butylphenoxy group, a 4-methoxyphenoxy group, a 2,6-dimethoxyphenoxy group, a 3,5-dimethoxyphenoxy group, a 2-chlorophenoxy group, a 4-nitorosophenoxy group, a 4-nitrophenoxy group, a 2-aminophenoxy group, a 3-aminophenoxy group, a 4-aminothiophenoxy group, a 2,3,6-trichlorophenoxy group, a 2,4,6-trifluorophenoxy group, a thiomethoxy group, a dimethylamino group, a diethylamino group, a dipropylamino group, a diphenylamino group, an isopropylamino group, a tert-butylamino group, a pyrrolyl group, a dimethylphosphino group, a 2-(2-oxy-1-propyl)phenoxy group, a 3,4-dihydroxyphenyl group, a 3,5-dihydroxyphenyl group, a 1-isopropyl-3,4-dihydroxyphenyl group, a 3-methoxy-4,5-dihydroxyphenyl group, a 1,8-dihydroxynaphthyl group, a 1,2-dihydroxynaphthyl group, a 4-(2-hydroxyphenyl)-2-hydroxyphenyl group, a 3-(2-hydroxynaphthyl)-2-hydroxynaphthyl group, a 2,2'-dihydroxy-6,6'-dimethylbiphenyl group, a 4,4',6,6'-tetra-tert-butyl-2,2'-methylenediphenoxy group, and a 4,4',6,6'-tetramethyl-2,2'-isobutylidene diphenoxy group.

Also, an example of the hetero atom-containing group is a group represented by following formula [6]:

$$R^3{}_3P=N—$$ [6]

wherein three $R^3$s are independently of one another a hydrogen atom, a halogen atom or a hydrocarbyl group, and are the same as, or different from one another, and any two or three thereof may be linked to one another to form a ring structure.

Examples of the halogen atom of $R^3$ are a fluorine atom, a chlorine atom, a bromine atom, and an iodine atom. Examples of the hydrocarbyl group of $R^3$ are a methyl group, an ethyl group, a n-propyl group, an isopropyl group, n-butyl group, a tert-butyl group, a cyclopropyl group, a cyclobutyl group, a cycloheptyl group, a cyclohexyl group, a phenyl group, a 1-naphthyl group, a 2-naphthyl group and a benzyl group.

Further, an example of the hetero atom-containing group is a group represented by following formula [7]:

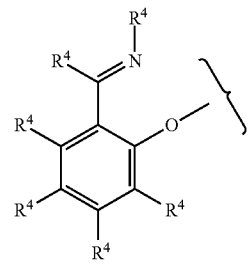

[7]

wherein six $R^4$s are independently of one another a hydrogen atom, a halogen atom, a hydrocarbyl group, a halogenated hydrocarbyl group, a hydrocarbyloxy group, a silyl group, or an amino group, and are the same as, or different from one another, and any two or more thereof may be linked to one another to form a ring structure.

Examples of $R^4$ are a hydrogen atom, a fluorine atom, chlorine atom, a bromine atom, an iodine atom, a phenyl group, a 1-naphthyl group, a 2-naphthyl group, a tert-butyl group, a 2,6-dimethylphenyl group, a 2-fluorenyl group, a 2-methylphenyl group, a 4-trifluoromethylphenyl group, a 4-methoxyphenyl group, a 4-pyridyl group, a cyclohexyl group, a 2-isopropylphenyl group, a benzyl group, methyl group, a triethylsilyl group, a diphenylmethylsilyl group, a 1-methyl-1-phenylethyl group, a 1,1-dimethylpropyl group, a 2-chlorophenyl group and a pentafluorophenyl group.

The "chelating ligand" of $L^1$ in formula [1] means a ligand having plural coordinating positions. Examples of the chelating ligand are acetylacetonate, diimine, oxazoline, bisoxazoline, terpyridine, acylhydrazone, diethylenetriamine, triethylenetetramine, porphyrin, crown ether and cryptate.

Examples of the heterocyclic group of $L^1$ in formula [1] are a pyridyl group, an N-substituted imidazolyl group and an N-substituted indazolyl group. Among them, preferred is a pyridyl group.

When plural $L^1$s in formula [1] are linked to one another through the linking group, the linking group is preferably a divalent linking group, wherein (i) its one atom linking directly to two $L^1$s is, or its two terminal atoms linking directly to each of two $L^1$s are a carbon atom, a silicon atom, a nitrogen atom, an oxygen atom, a sulfur atom or a phosphorus atom, and (ii) the number of atoms existing between two $L^1$s in the shortest distance is three or less. Above (i) and (ii) are explained below by use of specific divalent linking groups. Regarding a 1-methyl-ethylene group, —CH$_2$—CH(CH$_3$)—, (i) its black-faced one carbon atom links directly to two L¹s, and (ii) its black-faced one carbon atom exists between two L¹s in the shortest distance (two methyl groups are not counted). Regarding an isopropylene group, —CH$_2$—CH(CH$_3$)—, (i) its black-faced two carbon atoms link directly to two L¹s, respectively, and (ii) its black-faced two carbon atoms exist between two L¹s in the shortest distance (one methyl group and two hydrogen atoms are not counted). Regarding a n-propylene group, —CH$_2$—CH$_2$—CH$_2$—, (i) its terminal black-faced two carbon atoms link directly to two L¹s, respectively, and (ii) its black-faced three carbon atoms exist between two L¹s in the shortest distance (six hydrogen atoms are not counted). Regarding a dimethylsilylene group, —Si(CH$_3$)$_2$—, (i) its black-faced one silicon atom links directly to two L¹s, and (ii) its black-faced one silicon atom exists between two L¹s in the shortest distance (two methyl groups are not counted).

Examples of the linking group are an alkylene group such as a methylene group, an ethylene group, a n-propylene group and a 1-methyl-ethylene group; a substituted alkylene group such as a dimethylmethylene group (isopropylidene group) and a diphenylmethylene group; a silylene group; a substituted silylene group such as a dimethylsilylene group, a diethylsilylene group, a diphenylsilylene group, a tetramethyldisilylene group and a dimethoxysilylene group; and a hetero atom such as a nitrogen atom, an oxygen atom, a sulfur atom and a phosphorus atom. Among them, particularly preferred is a methylene group, an ethylene group, a dimethylmethylene group (isopropylidene group), a diphenylmethylene group, a dimethylsilylene group, a diethylsilylene group, a diphenylsilylene group, or a dimethoxysilylene group.

Examples of the halogen atom of X¹ in formula [1] are a fluorine atom, a chlorine atom, a bromine atom and an iodine atom. Examples of the hydrocarbyl group of X¹ are an alkyl group, an aralkyl group, an aryl group and an alkenyl group. Among them, preferred is an alkyl group having 1 to 20 carbon atoms, an aralkyl group having 7 to 20 carbon atoms, an aryl group having 6 to 20 carbon atoms, or an alkenyl group having 3 to 20 carbon atoms.

Examples of the alkyl group having 1 to 20 carbon atoms are a methyl group, an ethyl group, a n-propyl group, an isopropyl group, a n-butyl group, a sec-butyl group, a tert-butyl group, an isobutyl group, a n-pentyl group, a neopentyl group, an amyl group, a n-hexyl group, a n-octyl group, a n-decyl group, a n-dodecyl group, a n-pentadecyl group and a n-eicosyl group. Among them, preferred is a methyl group, an ethyl group, an isopropyl group, a tert-butyl group, an isobutyl group or an amyl group. Those alkyl groups may be substituted with a halogen atom such as a fluorine atom, a chlorine atom, a bromine atom, and an iodine atom. Examples of the alkyl group substituted with a halogen atom are a fluoromethyl group, a trifluoromethyl group, a chloromethyl group, a trichloromethyl group, a fluoroethyl group, a pentafluoroethyl group, a perfluoropropyl group, a perfluorobutyl group, a perfluorohexyl group, a perfluorooctyl group, a perchloropropyl group, a perchlorobutyl group, and a perbromopropyl group. Those alkyl groups may also be substituted with an alkoxy group such as a methoxy group and an ethoxy group; an aryloxy group such as a phenoxy group; or an aralkyloxy group such as a benzyloxy group.

Examples of the above aralkyl group having 7 to 20 carbon atoms are a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-dodecylphenyl)methyl group, a naphthylmethyl group and an anthracenylmethyl group. Among them, preferred is a benzyl group. Those aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above aryl group having 6 to 20 carbon are a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group. Among them, preferred is a phenyl group. Those aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the alkenyl group having 3 to 20 carbon atoms are an ally group, a methally group, a crotyl group and a 1,3-diphenyl-2-propenyl group. Among them, preferred is an allyl group or a methally group.

Examples of the hydrocarbyloxy group of X¹ in formula [1] are an alkoxy group, an aralkyloxy group and an aryloxy group. Among them, preferred is an alkoxy group having 1 to 20 carbon atoms, an aralkyloxy group having 7 to 20 carbon atoms or an aryloxy group having 6 to 20 carbon atoms.

Examples of the alkoxy group having 1 to 20 carbon atoms are a methoxy group, an ethoxy group, a n-propoxy group, an isopropoxy group, a n-butoxy group, a sec-butoxy group, a tert-butoxy group, a n-pentoxy group, a neopentoxy group, a n-hexoxy group, a n-octoxy group, a n-dodecoxy group, a n-pentadecoxy group and a n-eicosoxy group. Among them, preferred is a methoxy group, an ethoxy group, an isopropoxy group or a tert-butoxy group. Those alkoxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above aralkyloxy group having 7 to 20 carbon atoms are a benzyloxy group, a (2-methylphenyl) methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl) methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a naphthylmethoxy group and an anthracenylmethoxy group. Among them, preferred is a benzyloxy group. Those aralkyloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Examples of the above aryloxy group having 6 to 20 carbon atoms are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2-tert-butyl-3-methylphenoxy group, a 2-tert-butyl-4-methylphenoxy group, a 2-tert-butyl-5-methylphenoxy group, a 2-tert-butyl-6-methylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 2-tert-butyl-3,4-dimethylphenoxy group, a 2-tert-butyl-3,5-dimethylphenoxy group, a 2-tert-butyl-3,6-dimethylphenoxy group, a 2,6-di-tert-butyl-3-methylphenoxy group, a 2-tert-butyl-4,5-dimethylphenoxy group, a 2,6-di-tert-butyl-4-methylphenoxy group, a 3,4,5-trimethylphenoxy group, a 2,3,4,5-tetramethylphenoxy group, a 2-tert-butyl-3,4,5-trimethylphenoxy group, a 2,3,4,6-tetramethylphenoxy group, a 2-tert-butyl-3,4,6-trimethylphenoxy group, a 2,6-di-tert-butyl-3,4-dimethylphenoxy group, a 2,3,5,6-tetramethylphenoxy group, a 2-tert-butyl-3,5,6-trimethylphenoxy group, a 2,6-di-tert-butyl-3,5-dimethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group and an anthracenoxy group. Amang them, preferred is a phenoxy group. These aryloxy groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

$X^1$ in formula [1] is preferably a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, or a benzyl group.

In formula [1], a is a number satisfying $0 < a \leq 3$, and b is a number satisfying $0 < b \leq 3$, and a and b are appropriately selected depending on the valence of $M^1$. When $M^1$ is a titanium atom, a zirconium atom or a hafnium atom, a and b are preferably 2.

Examples of the compound represented by formula [1], wherein the transition metal atom is a titanium atom, a zirconium atom or a hafnium atom, are bis(cyclopentadienyl)titanium dichloride, bis(methylcyclopentadienyl)titanium dichloride, bis(ethylcyclopentadienyl)titanium dichloride, bis(n-butylcyclopentadienyl)titanium dichloride, bis(tert-butylcyclopentadienyl)titanium dichloride, bis(1,2-dimethylcyclopentadienyl)titanium dichloride, bis(1,3-dimethylcyclopentadienyl)titanium dichloride, bis(1-methyl-2-ethylcyclopentadienyl)titanium dichloride, bis(1-methyl-3-ethylcyclopentadienyl)titanium dichloride, bis(1-methyl-2-n-butylcyclopentadienyl)titanium dichloride, bis(1-methyl-3-n-butylcyclopentadienyl)titanium dichloride, bis(1-methyl-2-isopropylcyclopentadienyl)titanium dichloride, bis(1-methyl-3-isopropylcyclopentadienyl)titanium dichloride, bis(1-tert-butyl-2-methylcyclopentadienyl)titanium dichloride, bis(1-tert-butyl-3-methylcyclopentadienyl)titanium dichloride, bis(1,2,3-trimethylcyclopentadienyl)titanium dichloride, bis(1,2,4-trimethylcyclopentadienyl)titanium dichloride, bis(tetramethylcyclopentadienyl)titanium dichloride, bis(pentamethylcyclopentadienyl)titanium dichloride, bis(indenyl)titanium dichloride, bis(4,5,6,7-tetrahydroindenyl)titanium dichloride, bis(fluorenyl)titanium dichloride, bis(2-phenylindenyl)titanium dichloride, bis[2-(bis-3,5-trifluoromethylphenyl)indenyl]titanium dichloride, bis[2-(4-tert-butylphenyl)indenyl]titanium dichloride, bis[2-(4-trifluoromethylphenyl)indenyl]titanium dichloride, bis[2-(4-methylphenyl)indenyl]titanium dichloride, bis[2-(3,5-dimethylphenyl)indenyl]titanium dichloride, bis[2-(pentafluorophenyl)indenyl]titanium dichloride, cyclopentadienyl(pentamethylcyclopentadienyl)titanium dichloride, cyclopentadienyl(indenyl)titanium dichloride, cyclopentadienyl(fluorenyl)titanium dichloride, indenyl(fluorenyl)titanium dichloride, pentamethylcyclopentadienyl(indenyl)titanium dichloride, pentamethylcyclopentadienyl(fluorenyl)titanium dichloride, cyclopentadienyl(2-phenylindenyl)titanium dichloride, pentamethylcyclopentadienyl(2-phenylindenyl)titanium dichloride, dimethylsilylenebis(cyclopentadienyl)titanium dichloride, dimethylsilylenebis(2-methylcyclopentadienyl) titanium dichloride, dimethylsilylenebis(3-methylcyclopentadienyl)titanium dichloride, dimethylsilylenebis(2-n-butylcyclopentadienyl)titanium dichloride, dimethylsilylenebis(3-n-butylcyclopentadienyl)titanium dichloride, dimethylsilylenebis(2,3-dimethylcyclopentadienyl)titanium dichloride, dimethylsilylenebis(2,4-dimethylcyclopentadienyl)titanium dichloride, dimethylsilylenebis(2,5-dimethylcyclopentadienyl)titanium dichloride, dimethylsilylenebis(3,4-dimethylcyclopentadienyl)titanium dichloride, dimethylsilylenebis(2-ethyl-3-methylcyclopentadienyl) titanium dichloride, dimethylsilylenebis(2-ethyl-4-methylcyclopentadienyl) titanium dichloride, dimethylsilylenebis(2-ethyl-5-methylcyclopentadienyl) titanium dichloride, dimethylsilylenebis(3-ethyl-5-methylcyclopentadienyl) titanium dichloride, dimethylsilylenebis(2,3,4-trimethylcyclopentadienyl) titanium dichloride, dimethylsilylenebis(2,3,5-trimethylcyclopentadienyl) titanium dichloride, dimethylsilylenebis(tetramethylcyclopentadienyl)titanium dichloride, dimethylsilylenebis(indenyl)titanium dichloride, dimethylsilylenebis(2-methylindenyl)titanium dichloride, dimethylsilylenebis(2-tert-butylindenyl)titanium dichloride, dimethylsilylenebis(2,3-dimethylindenyl)titanium dichloride, dimethylsilylenebis(2,4,7-trimethylindenyl)titanium dichloride, dimethylsilylenebis(2-methyl-4-isopropylindenyl)titanium dichloride, dimethylsilylenebis(4,5-benzindenyl)titanium dichloride, dimethylsilylenebis(2-methyl-4,5-benzindenyl)titanium dichloride, dimethylsilylenebis(2-phenylindenyl)titanium dichloride, dimethylsilylenebis(4-phenylindenyl)titanium dichloride, dimethylsilylenebis(2-methyl-4-phenylindenyl)titanium dichloride, dimethylsilylenebis(2-methyl-5-phenylindenyl)titanium dichloride, dimethylsilylenebis(2-methyl-4-naphthylindenyl)titanium dichloride, dimethylsilylenebis(4,5,6,7-tetrahydroindenyl)titanium dichloride, dimethylsilylene(cyclopentadienyl)(indenyl)titanium dichloride, dimethylsilylene(methylcyclopentadienyl)(indenyl)titanium dichloride, dimethylsilylene(n-butylcyclopentadienyl)(indenyl)titanium dichloride, dimethylsilylene(tetramethylcyclopentadienyl)(indenyl) titanium dichloride, dimethylsilylene(cyclopentadienyl)(fluorenyl)titanium dichloride, dimethylsilylene(methylcyclopentadienyl)(fluorenyl) titanium dichloride, dimethylsilylene(n-butylcyclopentadienyl)(fluorenyl) titanium dichloride, dimethylsilylene(tetramethylcyclopentadienyl)(indenyl) titanium dichloride, dimethylsilylene(indenyl)(fluorenyl)titanium dichloride, dimethylsilylenebis(fluorenyl)titanium dichloride, dimethylsilylene(cyclopentadienyl)(tetramethylcyclo pentadienyl)titanium dichloride, dimethylsilylene(tetramethylcyclopentadienyl)(fluorenyl) titanium dichloride, cyclopentadienyltitanium trichloride, pentamethylcyclopentadienyltitanium trichloride, cyclopentadienyl(dimethylamido)titanium dichloride, cyclopentadienyl(phenoxy)titanium dichloride, cyclopentadienyl(2,6-dimethylphenyl)titanium dichloride, cyclopentadienyl(2,6-diisopropylphenyl)titanium dichloride, cyclopentadienyl(2,6-di-tert-butylphenyl)titanium dichloride, pentamethylcyclopentadienyl(2,6-dimethylphenyl)titanium dichloride, pentamethylcyclopentadienyl(2,6-diisopropylphenyl)titanium dichloride, pentamethylcyclopentadienyl(2,6-tert-butylphenyl)titanium dichloride, indenyl(2,6-diisopropylphenyl)titanium dichloride, fluorenyl(2,6-diisopropylphenyl)titanium dichloride, dimethylsilylene(cyclopentadienyl)(2-phenoxy)titanium dichloride, dimethylsilylene(cyclopentadienyl)(3-methyl-2-phenoxy) titanium dichloride, dimethylsilylene(cyclopentadienyl)(3,5-dimethyl-2-phenoxy) titanium dichloride, dimethylsilylene(cyclopentadienyl)(3-tert-butyl-2-phenoxy) titanium dichloride, dimethylsilylene(cyclopentadienyl)(3-tert-butyl-5-methyl-2-phenoxy)titanium dichloride, dimethylsilylene(cyclopentadienyl)(3,5-di-tert-butyl-2-phenoxy)titanium dichloride, dimethylsilylene(cyclopentadienyl)(5-methyl-3-phenyl-2-phenoxy)titanium dichloride, dimethylsilylene(cyclopentadienyl)(3-tert-butyldimethyl silyl-5-methyl-2-phenoxy)titanium dichloride, dimethylsilylene(cyclopentadienyl)(5-methyl-3-trimethyl silyl-2-phenoxy) titanium dichloride, dimethylsilylene(cyclopentadienyl)(3-tert-butyl-5-methoxy-2-phenoxy)titanium dichloride, dimethylsilylene(cyclopentadienyl)(3-tert-butyl-5-chloro-2-phenoxy)titanium dichloride, dimethylsilylene(cyclopentadienyl)(3,5-diamyl-2-phenoxy) titanium dichloride, dimethylsilylene(cyclopentadienyl)(3-phenyl-2-phenoxy) titanium dichloride, dimethylsilylene(cyclopentadienyl)(1-naphthoxy-2-yl) titanium dichloride, dimethylsilylene(methylcyclopentadienyl)(2-phenoxy) titanium dichloride, dimethylsilylene(methylcyclopentadienyl)(3-methyl-2-phenoxy) titanium dichloride, dimethylsilylene(methylcyclopentadienyl)(3,5-dimethyl-2-phenoxy)titanium dichloride, dimethylsilylene(methylcyclopentadienyl)(3-tert-butyl-2-phenoxy)titanium dichloride, dimethylsilylene(methylcyclopentadienyl)(3-tert-butyl-5-methyl-2-phenoxy) titanium dichloride, dimethylsilylene(methylcyclopentadienyl)(3,5-di-tert-butyl-2-phenoxy) titanium dichloride, dimethylsilylene(methylcyclopentadienyl)(5-methyl-3-phenyl-2-phenoxy) titanium dichloride, dimethylsilylene(methylcyclopentadienyl)(3-tert-butyl dimethylsilyl-5-methyl-2-phenoxy)titanium dichloride, dimethylsilylene(methylcyclopentadienyl)(5-methyl-3-trimethylsilyl-2-phenoxy)titanium dichloride, dimethylsilylene(methylcyclopentadienyl)(3-tert-butyl-5-methoxy-2-phenoxy)titanium dichloride, dimethylsilylene(methylcyclopentadienyl)(3-tert-butyl-5-chloro-2-phenoxy) titanium dichloride, dimethylsilylene(methylcyclopentadienyl)(3,5-diamyl-2-phenoxy)titanium dichloride, dimethylsilylene(methylcyclopentadienyl)(3-phenyl-2-phenoxy)titanium dichloride, dimethylsilylene(methylcyclopentadienyl)(1-naphthoxy-2-yl) titanium dichloride, dimethylsilylene(n-butylcyclopentadienyl)(2-phenoxy) titanium dichloride, dimethylsilylene(n-butylcyclopentadienyl)(3-methyl-2-phenoxy)titanium dichloride, dimethylsilylene(n-butylcyclopentadienyl)(3,5-dimethyl-2-phenoxy)titanium dichloride, dimethylsilylene(n-butylcyclopentadienyl)(3-tert-butyl-2-phenoxy)titanium dichloride, dimethylsilylene(n-butylcyclopentadienyl)(3-tert-butyl-5-methyl-2-phenoxy)titanium dichloride, dimethylsilylene(n-butylcyclopentadienyl)(3,5-di-tert-butyl-2-phenoxy)titanium dichloride, dimethylsilylene(n-butylcyclopentadienyl)(5-methyl-3-phenyl-2-phenoxy)titanium dichloride, dimethylsilylene(n-butylcyclopentadienyl)(3-tert-butyl dimethylsilyl-5-methyl-2-phenoxy)titanium dichloride, dimethylsilylene(n-butylcyclopentadienyl)(5-methyl-3-trimethylsilyl-2-phenoxy)titanium dichloride, dimethylsilylene(n-butylcyclopentadienyl)(3-tert-butyl-5-methoxy-2-phenoxy) titanium dichloride, dimethylsilylene(n-butylcyclopentadienyl)(3-tert-butyl-5-chloro-2-phenoxy) titanium dichloride, dimethylsilylene(n-butylcyclopentadienyl)(3,5-diamyl-2-phenoxy)titanium dichloride, dimethylsilylene(n-butylcyclopentadienyl)(3-phenyl-2-phenoxy)titanium dichloride, dimethylsilylene(n-butylcyclopentadienyl)(1-naphthoxy-2-yl) titanium dichloride, dimethylsilylene(tert-butylcyclopentadienyl)(2-phenoxy) titanium dichloride, dimethylsilylene(tert-butylcyclopentadienyl)(3-methyl-2-phenoxy)titanium dichloride, dimethylsilylene(tert-butylcyclopentadienyl)(3,5-dimethyl-2-phenoxy)titanium dichloride, dimethylsilylene(tert-butylcyclopentadienyl)(3-tert-butyl-2-phenoxy)titanium dichloride, dimethylsilylene(tert-butylcyclopentadienyl) (3-tert-butyl-5-methyl-2-phenoxy) titanium dichloride, dimethylsilylene(tert-butylcyclopentadienyl)(3,5-di-tert-butyl-2-phenoxy) titanium dichloride, dimethylsilylene(tert-butylcyclopentadienyl)(5-methyl-3-phenyl-2-phenoxy) titanium dichloride, dimethylsilylene(tert-butylcyclopentadienyl)(3-tert-butyldimethylsilyl-5-methyl-2-phenoxy)titanium dichloride, dimethylsilylene(tert-butylcyclopentadienyl)(5-methyl-3-trimethylsilyl-2-phenoxy)titanium dichloride, dimethylsilylene(tert-butylcyclopentadienyl)(3-tert-butyl-5-methoxy-2-phenoxy) titanium dichloride, dimethylsilylene(tert-butylcyclopentadienyl)(3-tert-butyl-5-chloro-2-phenoxy) titanium dichloride, dimethylsilylene(tert-butylcyclopentadienyl) (3,5-diamyl-2-phenoxy)titanium dichloride, dimethylsilylene(tert-butylcyclopentadienyl)(3-phenyl-2-phenoxy)titanium dichloride, dimethylsilylene(tert-butylcyclopentadienyl)(1-naphthoxy-2-yl)titanium dichloride, dimethylsilylene(tetramethylcyclopentadienyl) (2-phenoxy) titanium dichloride, dimethylsilylene(tetramethylcyclopentadienyl)(3-methyl-2-phenoxy)titanium dichloride, dimethylsilylene(tetramethylcyclopentadienyl)

(3,5-dimethyl-2-phenoxy)titanium dichloride, dimethylsilylene(tetramethylcyclopentadienyl)(3-tert-butyl-2-phenoxy)titanium dichloride, dimethylsilylene(tetramethylcyclopentadienyl)(3-tert-butyl-5-methyl-2-phenoxy)titanium dichloride, dimethylsilylene(tetramethylcyclopentadienyl)(3,5-di-tert-butyl-2-phenoxy)titanium dichloride, dimethylsilylene(tetramethylcyclopentadienyl)(5-methyl-3-phenyl-2-phenoxy)titanium dichloride, dimethylsilylene(tetramethylcyclopentadienyl)(3-tert-butyl dimethylsilyl-5-methyl-2-phenoxy)titanium dichloride, dimethylsilylene(tetramethylcyclopentadienyl)(5-methyl-3-trimethylsilyl-2-phenoxy)titanium dichloride, dimethylsilylene(tetramethylcyclopentadienyl)(3-tert-butyl-5-methoxy-2-phenoxy)titanium dichloride, dimethylsilylene(tetramethylcyclopentadienyl)(3-tert-butyl-5-chloro-2-phenoxy)titanium dichloride, dimethylsilylene(tetramethylcyclopentadienyl)(3,5-diamyl-2-phenoxy)titanium dichloride, dimethylsilylene(tetramethylcyclopentadienyl)(3-phenyl-2-phenoxy)titanium dichloride, dimethylsilylene(tetramethylcyclopentadienyl)(1-naphthoxy-2-yl)titanium dichloride, dimethylsilylene(trimethylsilylcyclopentadienyl)(2-phenoxy) titanium dichloride, dimethylsilylene(trimethylsilylcyclopentadienyl)(3-methyl-2-phenoxy)titanium dichloride, dimethylsilylene(trimethylsilylcyclopentadienyl)(3,5-dimethyl-2-phenoxy)titanium dichloride, dimethylsilylene(trimethylsilylcyclopentadienyl)(3-tert-butyl-2-phenoxy)titanium dichloride, dimethylsilylene(trimethylsilylcyclopentadienyl)(3-tert-butyl-5-methyl-2-phenoxy)titanium dichloride, dimethylsilylene(trimethylsilylcyclopentadienyl)(3,5-di-tert-butyl-2-phenoxy)titanium dichloride, dimethylsilylene(trimethylsilylcyclopentadienyl)(5-methyl-3-phenyl-2-phenoxy)titanium dichloride, dimethylsilylene(trimethylsilylcyclopentadienyl)(3-tert-butyldimethylsilyl-5-methyl-2-phenoxy)titanium dichloride, dimethylsilylene(trimethylsilylcyclopentadienyl)(5-methyl-3-trimethylsilyl-2-phenoxy)titanium dichloride, dimethylsilylene(trimethylsilylcyclopentadienyl)(3-tert-butyl-5-methoxy-2-phenoxy)titanium dichloride, dimethylsilylene(trimethylsilylcyclopentadienyl)(3-tert-butyl-5-chloro-2-phenoxy)titanium dichloride, dimethylsilylene(trimethylsilylcyclopentadienyl)(3,5-diamyl-2-phenoxy)titanium dichloride, dimethylsilylene(trimethylsilylcyclopentadienyl)(3-phenyl-2-phenoxy)titanium dichloride, dimethylsilylene(trimethylsilylcyclopentadienyl)(1-naphthoxy-2-yl)titanium dichloride, dimethylsilylene(indenyl)(2-phenoxy)titanium dichloride, dimethylsilylene(indenyl)(3-methyl-2-phenoxy) titanium dichloride, dimethylsilylene(indenyl)(3,5-dimethyl-2-phenoxy)titanium dichloride, dimethylsilylene(indenyl)(3-tert-butyl-2-phenoxy) titanium dichloride, dimethylsilylene(indenyl)(3-tert-butyl-5-methyl-2-phenoxy) titanium dichloride, dimethylsilylene(indenyl)(3,5-di-tert-butyl-2-phenoxy) titanium dichloride, dimethylsilylene(indenyl)(5-methyl-3-phenyl-2-phenoxy) titanium dichloride, dimethylsilylene(indenyl)(3-tert-butyldimethylsilyl-5-methyl-2-phenoxy)titanium dichloride, dimethylsilylene(indenyl)(5-methyl-3-trimethylsilyl-2-phenoxy)titanium dichloride, dimethylsilylene(indenyl)(3-tert-butyl-5-methoxy-2-phenoxy) titanium dichloride, dimethylsilylene(indenyl)(3-tert-butyl-5-chloro-2-phenoxy) titanium dichloride, dimethylsilylene(indenyl)(3,5-diamyl-2-phenoxy)titanium dichloride, dimethylsilylene(indenyl)(3-phenyl-2-phenoxy)titanium dichloride, dimethylsilylene(indenyl)(1-naphthoxy-2-yl)titanium dichloride, dimethylsilylene(fluorenyl)(2-phenoxy)titanium dichloride, dimethylsilylene(fluorenyl)(3-methyl-2-phenoxy)titanium dichloride, dimethylsilylene(fluorenyl)(3,5-dimethyl-2-phenoxy) titanium dichloride, dimethylsilylene(fluorenyl)(3-tert-butyl-2-phenoxy) titanium dichloride, dimethylsilylene(fluorenyl)(3-tert-butyl-5-methyl-2-phenoxy)titanium dichloride, dimethylsilylene(fluorenyl)(3,5-di-tert-butyl-2-phenoxy) titanium dichloride, dimethylsilylene(fluorenyl)(5-methyl-3-phenyl-2-phenoxy) titanium dichloride, dimethylsilylene(fluorenyl)(3-tert-butyldimethylsilyl-5-methyl-2-phenoxy) titanium dichloride, dimethylsilylene(fluorenyl)(5-methyl-3-trimethylsilyl-2-phenoxy)titanium dichloride, dimethylsilylene(fluorenyl)(3-tert-butyl-5-methoxy-2-phenoxy)titanium dichloride, dimethylsilylene(fluorenyl)(3-tert-butyl-5-chloro-2-phenoxy)titanium dichloride, dimethylsilylene(fluorenyl)(3,5-diamyl-2-phenoxy)titanium dichloride, dimethylsilylene(fluorenyl)(3-phenyl-2-phenoxy)titanium dichloride, dimethylsilylene(fluorenyl)(1-naphthoxy-2-yl)titanium dichloride, (tert-butylamido)tetramethylcyclopentadienyl-1,2-ethanediyltitanium dichloride, (methylamido)tetramethylcyclopentadienyl-1,2-ethanediyl titanium dichloride, (ethylamido)tetramethylcyclopentadienyl-1,2-ethanediyl titanium dichloride, (tert-butylamido)tetramethylcyclopentadienyldimethylsilane titanium dichloride, (benzylamido)tetramethylcyclopentadienyldimethylsilane titanium dichloride, (phenylphosphido)tetramethylcyclopentadienyldimethylsilane titanium dichloride, (tert-butylamido)indenyl-1,2-ethanediyltitanium dichloride, (tert-butylamido)tetrahydroindenyl-1,2-ethanediyltitanium dichloride, (tert-butylamido)fluorenyl-1,2-ethanediyltitanium dichloride, (tert-butylamido) indenyldimethylsilanetitanium dichloride, (tert-butylamido) tetrahydroindenyldimethylsilanetitanium dichloride, (tert-butylamido) fluorenyldimethylsilanetitanium dichloride, (dimethylaminomethyl)tetramethylcyclopentadienyl titanium(III) dichloride, (dimethylaminoethyl)tetramethylcyclopentadienyl titanium(III) dichloride, (dimethylaminopropyl)tetramethylcyclopentadienyl titanium(III) dichloride, (N-pyrrolidinylethyl)tetramethylcyclopentadienyltitanium dichloride, (B-dimethylaminoborabenzene)cyclopentadienyltitanium dichloride, cyclopentadienyl(9-mesitylboraanthracenyl)titanium dichloride, 2,2'-thiobis[4-methyl-6-tert-butylphenoxy]titanium dichloride, 2,2'-thiobis[4-methyl-6-(1-methylethyl)phenoxy]titanium dichloride, 2,2'-thiobis(4,6-dimethylphenoxy)titanium dichloride, 2,2'-thiobis(4-methyl-6-tert-butylphenoxy)titanium dichloride, 2,2'-methylenebis(4-methyl-6-tert-butylphenoxy)titanium dichloride, 2,2'-ethylenebis(4-methyl-6-tert-butylphenoxy) titanium dichloride, 2,2'-sulfinylbis(4-methyl-6-tert-butylphenoxy)titanium dichloride, 2,2'-(4,4',6,6'-tetra-tert-butyl-1,1'-biphenoxy)titanium dichloride, (di-tert-butyl-1,3-propanediamido)titanium dichloride, (dicyclohexyl-1,3-propanediamido)titanium dichloride, [bis(trimethylsilyl)-1,3-propanediamido]titanium dichloride, [bis(tert-butyldimethylsilyl)-1,3-propanediamido]titanium dichloride, [bis(2,6-dimethylphenyl)-1,3-propanediamido] titanium dichloride, [bis(2,6-diisopropylphenyl)-1,3-propanediamido]titanium dichloride, [bis(2,6-di-tert-butylphenyl)-1,3-propanediamido]titanium dichloride, [bis(triisopropylsilyl)naphthalenediamido]titanium dichloride, [bis(trimethylsilyl)naphthalenediamido]titanium dichloride, [bis(tert-butyldimethylsilyl)naphthalenediamido]titanium dichloride, [hydrotris(3,5-dimethylpyrazolyl)borate]titanium trichloride, [hydrotris(3,5-diethylpyrazolyl)borate]titanium trichloride, [hydrotris(3,5-di-tert-butylpyrazolyl)borate]titanium trichloride, [tris(3,5-dimethylpyrazolyl)methyl]titanium trichloride, [tris(3,5-diethylpyrazolyl)

methyl]titanium trichloride, and [tris(3,5-di-tert-butylpyrazolyl)methyl]titanium trichloride; compounds obtained by changing "titanium" in the above compounds to "zirconium" or "hafnium"; compounds obtained by changing "(2-phenoxy)" in the above compounds to "(3-phenyl-2-phenoxy)", "(3-trimethylsilyl-2-phenoxy)" or "(3-tert-butyldimethylsilyl-2-phenoxy)"; compounds obtained by changing "dimethylsilylene" in the above compounds to "methylene", "ethylene", "dimethylmethylene(isopropylidene)", "diphenylmethylene", "diethylsilylene", "diphenylsilylene" or "dimethoxysilylene"; compounds obtained by changing "dichloride" in the above compounds to "difluoride", "dibromide", "diiodide", "dimethyl", "diethyl", "diisopropyl", "diphenyl", "dibenzyl", "dimethoxide", "diethoxide", "di(n-propoxide)", "di(isopropoxide)", "diphenoxide", or "di(pentafluorophenoxide)"; compounds obtained by changing "trichloride" in the above compounds to "trifluoride", "tribromide", "triiodide", "trimethyl", "triethyl", "triisopropyl", "triphenyl", "tribenzyl", "trimethoxide", "triethoxide", "tri(n-propoxide)", "tri(isopropoxide)", "triphenoxide" or "tri(pentafluorophenoxide)"; and a combination of two or more of the above compounds. Among them, preferred is a transition metal compound represented by formula [1] wherein $M^1$ is a zirconium atom, more preferred is a transition metal compound represented thereby wherein at least one $L^1$ is a cyclopentadiene-containing anionic group, and particularly preferred is a transition metal compound represented thereby wherein $M^1$ is a zirconium atom, and two $L^1$s are a cyclopentadiene-containing anionic group, and are linked to each other through the above-mentioned linking group.

The transition metal compound represented by formula [1] can be produced by a production method disclosed in a patent literature such as JP 6-340684A, JP 7-258321A, and WO 95/00562.

Activation Agent

The activation agent in the present invention is not particularly restricted in its kind, as long as it can activate the above-mentioned transition metal compound, or μ-oxo type dimmer thereof. When a specific particle is used as an activation agent in slurry polymerization, gas phase polymerization, or bulk polymerization to produce a particulate polymer, there can be obtained a particulate polymer having a uniform particle shape. Such an activation agent is preferably following modified particle (I), (II) or (III):

(I) a modified particle produced by a process comprising a step of contacting a compound (a) represented by following formula [3], a compound (b) represented by following formula [4], a compound (c) represented by following formula [5], and a particulate inorganic oxide (d) or a particulate organic polymer (d), with one another:

$$M^3 L^3_2 \quad [3]$$

$$R^1_{t-1} TH \quad [4]$$

$$R^2_{t-2} TH_2 \quad [5]$$

wherein $M^3$ is a typical metal atom of group 12 in the periodic table (revised edition of IUPAC Inorganic Chemistry Nomenclature 1989); $L^3$ is a hydrogen atom, a halogen atom or a hydrocarbyl group, and plural $L^3$s are the same as, or different from one another; $R^1$ is an electron-withdrawing group, or a group containing an electron-withdrawing group, and plural $R^1$s are the same as, or different from one another; $R^2$ is a hydrocarbyl group or a halogenated hydrocarbyl group; two Ts are independently of each other an atom of group 15 or 16 in the periodic table (revised edition of IUPAC Inorganic Chemistry Nomenclature 1989); and t is a valence of T;

(II) a modified particle produced by a process comprising a step of contacting an aluminoxane with a particulate inorganic oxide (d) or a particulate organic polymer (d); or (III) a modified particle produced by a process comprising a step of contacting an aluminoxane, a transition metal compound, and a particulate inorganic oxide (d) or a particulate organic polymer (d), with one another.

Above "particulate inorganic oxide (d)" and "particulate organic polymer (d)" are collectively referred to hereinafter as "particle (d)".

Examples of above $M^3$ are a zinc atom, a cadmium atom and a mercury atom. Among them, particularly preferred is a zinc atom.

Examples of the halogen atom of above $L^3$ are a fluorine atom, a chlorine atom, a bromine atom, and an iodine atom. The above hydrocarbyl group of $L^3$ is preferably an alkyl group, an aryl group or an aralkyl group.

The above alkyl group of $L^3$ is preferably an alkyl group having 1 to 20 carbon atoms such as a methyl group, an ethyl group, a n-propyl group, an isopropyl group, a n-butyl group, a sec-butyl group, a tert-butyl group, an isobutyl group, a n-pentyl group, a neopentyl group, a n-hexyl group, a n-heptyl group, a n-octyl group, a n-decyl group, a n-dodecyl group, a n-pentadecyl group and a n-eicosyl group, and more preferably a methyl group, an ethyl group, an isopropyl group, a tert-butyl group, or an isobutyl group. Those alkyl groups may be substituted with a halogen atom such as a fluorine atom, a chlorine atom, a bromine atom and an iodine atom. Examples of the halogenated alkyl are a fluoromethyl group, a difluoromethyl group, a trifluoromethyl group, a fluoroethyl group, a difluoroethyl group, a trifluoroethyl group, a tetrafluoroethyl group, a pentafluoroethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a 1H,1H-perfluoropropyl group, a 1H,1H-perfluorobutyl group, a 1H,1H-perfluoropentyl group, a 1H,1H-perfluorohexyl group, a 1H,1H-perfluorooctyl group, a 1H,1H-perfluorododecyl group, a 1H,1H-perfluoropentadecyl group and a 1H,1H-perfluoroeicosyl group; and halogenated alkyl groups obtained by changing "fluoro" in the above halogenated alkyl groups to "chloro", "bromo" or "iodo". Those alkyl groups may be substituted with an alkoxy group such as a methoxy group and an ethoxy group; an aryloxy group such as a phenoxy group; or an aralkyloxy group such as a benzyloxy group.

The above aryl group of $L^3$ is preferably an aryl group having 6 to 20 carbon atoms such as a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a n-propylphenyl group, an isopropylphenyl group, a n-butylphenyl group, a sec-butylphenyl group, a tert-butylphenyl group, an isobutylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group and an anthracenyl group, and more preferably is a phenyl group. Those aryl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

The above aralkyl group of $L^3$ is preferably an aralkyl group having 7 to 20 carbon atoms such as a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (3,5-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3,5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, an (isobutylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a naphthylmethyl group and an anthracenylmethyl group, and more preferably a benzyl group. Those aralkyl groups may be substituted with a halogen atom such as a fluorine atom, a chlorine atom, a bromine atom and an iodine atom; an alkoxy group such as a methoxy group and an ethoxy group; an aryloxy group such as a phenoxy group; or an aralkyloxy group such as a benzyloxy group.

Above $L^3$ is preferably a hydrogen atom, an alkyl group or an aryl group, more preferably a hydrogen atom or an alkyl group, and particularly preferably an alkyl group.

Examples of the above group 15 atom of T are a nitrogen atom and a phosphorus atom. Examples of the above group 16 atom of T are an oxygen atom and a sulfur atom. Among them, T is preferably a nitrogen atom or an oxygen atom, and particularly preferably an oxygen atom. When T is a group 15 atom, t is 3, and when T is a group 16 atom, t is 2.

While the substituent constant "σ" in Hammett's rule is known in the art as an index of an electron-withdrawing property, the above "electron-withdrawing group" of $R^1$ means a positive σ-carrying group. Examples of the "electron-withdrawing group" of $R^1$ are a fluorine atom, a chlorine atom, a bromine atom, an iodine atom, a cyano group, a nitro group, a carbonyl group, a sulfone group and a phenyl group. Examples of the "group containing an electron-withdrawing group" of $R^1$ are a halogenated alkyl group; a halogenated aryl group; a (halogenated alkyl)aryl group; a cyanated aryl group; a nitrated aryl group; and an ester group such as an alkoxycarbonyl group, an aralkyloxycarbonyl group and an aryloxycarbonyl group.

Examples of the above halogenated alkyl group of $R^1$ are a fluoromethyl group, a chloromethyl group, a bromomethyl group, a iodomethyl group, a difluoromethyl group, a dichloromethyl group, a dibromomethyl group, a diiodomethyl group, a trifluoromethyl group, a trichloromethyl group, a tribromomethyl group, a triiodomethyl group, a 2,2,2-trifluoroethyl group, a 2,2,2-trichloroethyl group, a 2,2,2-tribromoethyl group, a 2,2,2-triiodoethyl group, a 2,2,3,3,3-pentafluoropropyl group, a 2,2,3,3,3-pentachloropropyl group, a 2,2,3,3,3-pentabromopropyl group, a 2,2,3,3,3-pentaiodopropyl group, a 2,2,2-trifluoro-1-trifluoromethylethyl group, a 2,2,2-trichloro-1-trichloromethylethyl group, a 2,2,2-tribromo-1-tribromomethylethyl group, a 2,2,2-triiodo-1-triiodomethylethyl group, a 1,1-bis(trifluoromethyl)-2,2,2-trifluoroethyl group, a 1,1-bis(trichloromethyl)-2,2,2-trichloroethyl group, a 1,1-bis(tribromomethyl)-2,2,2-tribromoethyl group, and a 1,1-bis(triiodomethyl)-2,2,2-triiodoethyl group.

Examples of the above halogenated aryl group of $R^1$ are a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1-naphthyl group, a perfluoro-2-naphthyl group, a 2-chlorophenyl group, a 3-chlorophenyl group, a 4-chlorophenyl group, a 2,4-dichlorophenyl group, a 2,6-dichlorophenyl group, a 3,4-dichlorophenyl group, a 3,5-dichlorophenyl group, a 2,4,6-trichlorophenyl group, a 3,4,5-trichlorophenyl group, a 2,3,5,6-tetrachlorophenyl group, a pentachlorophenyl group, a 2,3,5,6-tetrachloro-4-trichloromethylphenyl group, a 2,3,5,6-tetrachloro-4-pentachlorophenylphenyl group, a perchloro-1-naphthyl group, a perchloro-2-naphthyl group, a 2-bromophenyl group, a 3-bromophenyl group, a 4-bromophenyl group, a 2,4-dibromophenyl group, a 2,6-dibromophenyl group, a 3,4-dibromophenyl group, a 3,5-dibromophenyl group, a 2,4,6-tribromophenyl group, a 3,4,5-tribromophenyl group, a 2,3,5,6-tetrabromophenyl group, a pentabromophenyl group, a 2,3,5,6-tetrabromo-4-tribromomethylphenyl group, a 2,3,5,6-tetrabromo-4-pentabromophenylphenyl group, a perbromo-1-naphthyl group, a perbromo-2-naphthyl group, a 2-iodophenyl group, a 3-iodophenyl group, a 4-iodophenyl group, a 2,4-diiodophenyl group, a 2,6-diiodophenyl group, a 3,4-diiodophenyl group, a 3,5-diiodophenyl group, a 2,4,6-triiodophenyl group, a 3,4,5-triiodophenyl group, a 2,3,5,6-tetraiodophenyl group, a pentaiodophenyl group, a 2,3,5,6-tetraiodo-4-triiodomethylphenyl group, a 2,3,5,6-tetraiodo-4-pentaiodophenylphenyl group, a periodo-1-naphthyl group, and a periodo-2-naphthyl group.

Examples of the above (halogenated alkyl)aryl group of $R^1$ are a 2-(trifluoromethyl)phenyl group, a 3-(trifluoromethyl)phenyl group, a 4-(trifluoromethyl)phenyl group, a 2,6-bis(trifluoromethyl)phenyl group, a 3,5-bis(trifluoromethyl)phenyl group, a 2,4,6-tris(trifluoromethyl)phenyl group, and a 3,4,5-tris(trifluoromethyl)phenyl group.

Examples of the above cyanated aryl group of $R^1$ are a 2-cyanophenyl group, a 3-cyanophenyl group, and a 4-cyanophenyl group.

Examples of the above nitrated aryl group of $R^1$ are a 2-nitrophenyl group, a 3-nitrophenyl group, and a 4-nitrophenyl group.

Examples of the above ester group of $R^1$ are a methoxycarbonyl group, an ethoxycarbonyl group, a n-propoxycarbonyl group, an isopropoxycarbonyl group, a phenoxycarbonyl group, a trifluoromethoxycarbonyl group, and a pentafluorophenoxycarbonyl group.

$R^1$ is preferably a halogenated hydrocarbyl group; more preferably a halogenated alkyl group or a halogenated aryl group; further preferably a fluoromethyl group, a difluoromethyl group, a trifluoromethyl group, a 2,2,2-trifluoroethyl group, a 2,2,3,3,3-pentafluoropropyl group, a 2,2,2-trifluoro-1-trifluoromethylethyl group, a 1,1-bis(trifluoromethyl)-2,2,2-trifluoroethyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 3,5-difluorophenyl group, a 2,4,6-trifluorophenyl group, a 3,4,5-trifluorophenyl group, a 2,3,5,6-tetrafluorophenyl group, a pentafluorophenyl group, a 2,3,5,6-tetrafluoro-4-trifluoromethylphenyl group, a 2,3,5,6-tetrafluoro-4-pentafluorophenylphenyl group, a perfluoro-1- naphthyl group, a perfluoro-2-naphthyl group, a chloromethyl group, a dichloromethyl group, a trichloromethyl group, a 2,2,2-trichloroethyl group, a 2,2,3,3,3-pentachloropropyl group, a 2,2,2-trichloro-1-trichloromethylethyl group, a 1,1-bis(trichloromethyl)-2,2,2-trichloroethyl group, a 4-chlorophenyl group, a 2,6-dichlorophenyl group, a 3,5-dichlorophenyl group, a 2,4,6-trichlorophenyl group, a 3,4,5-trichlorophenyl group, or a pentachlorophenyl group; particularly preferably a fluoroalkyl group or a fluoroaryl group; and most preferably a trifluoromethyl group, a 2,2,2-trifluoro-1-trifluoromethylethyl group, a 1,1-bis(trifluoromethyl)-2,2,2-trifluoroethyl group, a 3,5-difluorophenyl group, a 3,4,5-trifluorophenyl group, or a pentafluorophenyl group.

The above hydrocarbyl group of $R^2$ is preferably an alkyl group, an aryl group or an aralkyl group. Examples of the hydrocarbyl group of $R^2$ are those exemplified above as $L^3$. Examples of the above halogenated hydrocarbyl group of $R^2$ are a halogenated alkyl group, a halogenated aryl group and a (halogenated alkyl)aryl group. Examples of the halogenated hydrocarbyl group of $R^2$ are those exemplified above as $R^1$. $R^2$ is preferably a halogenated hydrocarbyl group, and further preferably a fluorinated hydrocarbyl group.

Examples of the compound (a), wherein $M^3$ is a zinc atom, are a dialkylzinc such as dimethylzinc, diethylzinc, dipropylzinc, di-n-butylzinc, diisobutylzinc and di-n-hexylzinc; a diarylzinc such as diphenylzinc, dinaphthylzinc and bis(pentafluorophenyl)zinc; a dialkenylzinc such as diallylzinc; bis(cyclopentadienyl) zinc; a halogenated alkylzinc such as methylzinc chloride, ethylzinc chloride, propylzinc chloride, n-butylzinc chloride, isobutylzinc chloride, n-hexylzinc chloride, methylzinc bromide, ethylzinc bromide, propylzinc bromide, n-butylzinc bromide, isobutylzinc bromide, n-hexylzinc bromide, methylzinc iodide, ethylzinc iodide, propylzinc iodide, n-butylzinc iodide, isobutylzinc iodide, and n-hexylzinc iodide; and a halogenated zinc such as zinc fluoride, zinc chloride, zinc bromide and zinc iodide. Among them, preferred is a dialkylzinc, more preferred is dimethylzinc, diethylzinc, dipropylzinc, di-n-butylzinc, diisobutylzinc or di-n-hexylzinc, and particularly preferred is dimethylzinc or diethylzinc.

When the above compound (b) is amines, examples thereof are di(fluoromethyl)amine, di(chloromethyl)amine, di(bromomethyl)amine, di(iodomethyl)amine, bis(difluoromethyl)amine, bis(dichloromethyl)amine, bis(dibromomethyl) amine, bis(diiodomethyl)amine, bis(trifluoromethyl)amine, bis(trichloromethyl)amine, bis(tribromomethyl)amine, bis(triiodomethyl)amine, bis (2,2,2-trifluoroethyl)amine, bis(2,2,2-trichloroethyl)amine, bis(2,2,2-tribromoethyl)amine, bis (2,2,2-triiodoethyl)amine, bis(2,2,3,3,3-pentafluoropropyl) amine, bis(2,2,3,3,3-pentachloropropyl)amine, bis(2,2,3,3, 3-pentabromopropyl)amine, bis(2,2,3,3,3-pentaiodopropyl) amine, bis(2,2,2-trifluoro-1-trifluoromethylethyl)amine, bis (2,2,2-trichloro-1-trichloromethylethyl)amine, bis(2,2,2-tribromo-1-tribromomethylethyl)amine, bis(2,2,2-triiodo-1-triiodomethylethyl)amine, bis(1,1-bis(trifluoromethyl)-2,2, 2-trifluoroethyl)amine, bis(1,1-bis(trichloromethyl)-2,2,2-trichloroethyl)amine, bis(1,1-bis(tribromomethyl)-2,2,2-tribromoethyl)amine, bis(1,1-bis(triiodomethyl)-2,2,2-triiodoethyl)amine, bis(2-fluorophenyl)amine, bis(3-fluorophenyl)amine, bis(4-fluorophenyl)amine, bis(2-chlorophenyl)amine, bis(3-chlorophenyl)amine, bis(4-chlorophenyl)amine, bis(2-bromophenyl)amine, bis(3-bromophenyl)amine, bis(4-bromophenyl)amine, bis(2-iodophenyl)amine, bis(3-iodophenyl)amine, bis(4-iodophenyl)amine, bis(2,6-difluorophenyl)amine, bis(3,5-difluorophenyl)amine, bis(2,6-dichlorophenyl)amine, bis(3, 5-dichlorophenyl)amine, bis(2,6-dibromophenyl)amine, bis (3,5-dibromophenyl)amine, bis(2,6-diiodophenyl)amine, bis (3,5-diiodophenyl)amine, bis(2,4,6-trifluorophenyl)amine, bis(2,4,6-trichlorophenyl)amine, bis(2,4,6-tribromophenyl) amine, bis(2,4,6-triiodophenyl)amine, bis(3,4,5-trifluorophenyl)amine, bis(3,4,5-trichlorophenyl)amine, bis(3,4,5-tribromophenyl)amine, bis(3,4,5-triiodophenyl)amine, bis (pentafluorophenyl)amine, bis(pentachlorophenyl)amine, bis(pentabromophenyl)amine, bis(pentaiodophenyl)amine, bis(2-(trifluoromethyl)phenyl)amine, bis(3-(trifluoromethyl)phenyl)amine, bis(4-(trifluoromethyl)phenyl)amine, bis(2,6-di(trifluoromethyl)phenyl)amine, bis(3,5-di(trifluoromethyl)phenyl)amine, bis(2,4,6-tri(trifluoromethyl)phenyl)amine, bis(3,4,5-tri(trifluoromethyl)phenyl)amine, bis (2-cyanophenyl)amine, bis(3-cyanophenyl)amine, bis(4-cyanophenyl)amine, bis(2-nitrophenyl)amine, bis(3-nitrophenyl)amine, and bis(4-nitrophenyl)amine.

When the above compound (b) is phosphines, examples thereof are those obtained by replacing the "nitrogen atom" in the above amines with a "phosphorus atom", and the phosphines has a name obtained by changing "amine" in the above amines to "phosphine".

When the above compound (b) is alcohols, examples thereof are fluoromethanol, chloromethanol, bromomethanol, iodomethanol, difluoromethanol, dichloromethanol, dibromomethanol, diiodomethanol, trifluoromethanol, trichloromethanol, tribromomethanol, triiodomethanol, 2,2, 2-trifluoroethanol, 2,2,2-trichloroethanol, 2,2,2-tribromoethanol, 2,2,2-triiodoethanol, 2,2,3,3,3-pentafluoropropanol, 2,2,3,3,3-pentachloropropanol, 2,2,3,3,3-pentbromopropanol, 2,2,3,3,3-pentaiodopropanol, 2,2,2-trifluoro-1-trifluoromethylethanol, 2,2,2-trichloro-1-trichloromethylethanol, 2,2,2-tribromo-1-tribromomethylethanol, 2,2,2-triiodo-1-triiodomethylethanol, 1,1-bis(trifluoromethyl)-2,2,2-trifluoroethanol, 1,1-bis(trichloromethyl)-2,2,2-trichloroethanol, 1,1-bis(tribromomethyl)-2,2,2-tribromoethanol, and 1,1-bis(triiodomethyl)-2,2,2-triiodoethanol.

When the above compound (b) is thiols, examples thereof are those obtained by replacing the "oxygen atom" in the above alcohols with a "sulfur atom", and the thiols has a name obtained by changing "methanol" in the above alcohols to "methanethiol", "ethanol" therein to "ethanethiol", and "propanol" therein to "propanethiol", respectively.

When the above compound (b) is phenols, examples thereof are 2-fluorophenol, 3-fluorophenol, 4-fluorophenol, 2,4-difluorophenol, 2,6-difluorophenol, 3,4-difluorophenol, 3,5-difluorophenol, 2,4,6-trifluorophenol, 3,4,5-trifluorophenol, 2,3,5,6-tetrafluorophenol, pentafluorophenol, 2,3, 5,6-tetrafluoro-4-trifluoromethylphenol, 2,3,5,6-tetrafluoro-4-pentafluorophenol, perfluoro-1-naphthol, perfluoro-2-naphthol, 2-chlorophenol, 3-chlorophenol, 4-chlorophenol, 2,4-dichlorophenol, 2,6-dichlorophenol, 3,4-dichlorophenol, 3,5-dichlorophenol, 2,4,6-trichlorophenol, 3,4,5-trichlorophenol, 2,3,5,6-tetrachlorophenol, pentachlorophenol, 2,3, 5,6-tetrachloro-4-trichloromethylphenol, 2,3,5,6-tetrachloro-4-pentachlorophenylphenol, perchloro-1-naphthol, perchloro-2-naphthol, 2-bromophenol, 3-bromophenol, 4-bromophenol, 2,4-dibromophenol, 2,6-dibromophenol, 3,4-dibromophenol, 3,5-dibromophenol, 2,4,6-tribromophenol, 3,4,5-tribromophenol, 2,3,5,6-tetrabromophenol, pentabromophenol, 2,3,5,6-tetrabromo-4-tribromomethylphenol, 2,3,5,6-tetrabromo-4-pentabromophenylphenol, perbromo-1-naphthol, perbromo-2-naphthol, 2-iodophenol, 3-iodophenol, 4-iodophenol, 2,4-diiodophenol, 2,6-diiodophenol, 3,4-diiodophenol, 3,5-diiodophenol, 2,4,6-triiodophenol, 3,4,5-triiodophenol, 2,3,5,6-tetraiodophenol, pentaiodophenol, 2,3,5,6-tetraiodo-4-triiodomethylphenol, 2,3,5,6-tetraiodo-4-pentaiodophenylphenol, periodo-1-naphthol, periodo-2-naphthol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, 3,4,5-tris(trifluoromethyl) phenol, 2-cyanophenol, 3-cyanophenol, 4-cyanophenol, 2-nitrophenol, 3-nitrophenol and 4-nitrophenol.

When the above compound (b) is thiophenols, examples thereof are those obtained by replacing the "oxygen atom" in the above phenols with a "sulfur atom", and the thiophenols has a name obtained by changing "phenol" in the above phenols to "thiophenol".

The compound (b) is preferably as follows: among amines, bis(trifluoromethyl)amine, bis(2,2,2-trifluoroethyl)amine, bis(2,2,3,3,3-pentafluoropropyl)amine, bis(2,2,2-trifluoro-1-trifluoromethylethyl)amine, bis(1,1-bis(trifluoromethyl)-2,2,2-trifluoroethyl)amine, or bis(pentafluorophenyl)amine; among alcohols, trifluoromethanol, 2,2,2-trifluoroethanol, 2,2,3,3,3-pentafluoropropanol, 2,2,2-trifluoro-1-trifluoromethylethanol, or 1,1-bis(trifluoromethyl)-2,2,2-trifluoroethanol; and among phenols, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 2-(trifluoromethyl)phenol, 3-(trifluoromethyl)phenol, 4-(trifluoromethyl)phenol, 2,6-bis(trifluoromethyl)phenol, 3,5-bis(trifluoromethyl)phenol, 2,4,6-tris(trifluoromethyl)phenol, or 3,4,5-tris(trifluoromethyl)phenol.

The compound (b) is more preferably bis(trifluoromethyl) amine, bis(pentafluorophenyl)amine, trifluoromethanol, 2,2,2-trifluoro-1-trifluoromethylethanol, 1,1-bis(trifluoromethyl)-2,2,2-trifluoroethanol, 2-fluorophenol, 3-fluorophenol, 4-fluorophenol, 2,6-difluorophenol, 3,5-difluorophenol, 2,4,6-trifluorophenol, 3,4,5-trifluorophenol, pentafluorophenol, 4-(trifluoromethyl)phenol, 2,6-bis(trifluoromethyl)phenol or 2,4,6-tris(trifluoromethyl)phenol; and further preferably 3,5-difluorophenol, 3,4,5-trifluorophenol, pentafluorophenol, or 1,1-bis(trifluoromethyl)-2,2,2-trifluoroethanol.

Examples of the compound (c) are water, hydrogen sulfide, an amine compound and an aniline compound. Examples of the amine compound are an alkylamine such as methylamine, ethylamine, n-propylamine, isopropylamine, n-butylamine, sec-butylamine, tert-butylamine, isobutylamine, n-pentylamine, neopentylamine, isopentylamine, n-hexylamine, n-octylamine, n-decylamine, n-dodecylamine, n-pentadecylamine and n-eicosylamine; cyclopentadienyl amine; an aralkyl amine such as benzylamine; a halogenated alkylamine such as fluoromethylamine, difluoromethylamine, trifluoromethylamine, 2,2,2-trifluoroethylamine, 2,2,3,3,3-pentafluoropropylamine, 2,2,2-trifluoro-1-trifluoromethylethylamine, 1,1-bis(trifluoromethyl)-2,2,2-trifluoroethylamine, perfluoropropylamine, perfluorobutylamine, perfluoropentylamine, perfluorohexylamine, perfluorooctylamine, perfluorododecylamine, perfluoropentadecylamine and perfluoroeicosylamine; and a halogenated alkylamine obtained by changing "fluoro" in the above amines to "chloro", "bromo" or "iodo".

Examples of the above aniline compound of the compound (c) are aniline, naphthylamine, anthracenylamine, 2-tolylamine, 3-tolylamine, 4-tolylamine, 2,3-xylylamine, 2,4-xylylamine, 2,5-xylylamine, 2,6-xylylamine, 3,4-xylylamine, 3,5-xylylamine, 2,3,4-trimethylaniline, 2,3,5-trimethylaniline, 2,3,6-trimethylaniline, 2,4,6-trimethylaniline, 3,4,5-trimethylaniline, 2,3,4,5-tetramethylaniline, 2,3,4,6-tetramethylaniline, 2,3,5,6-tetramethylaniline, pentamethylaniline, 2-ethylaniline, 3-ethylaniline, 4-ethylaniline, 2,3-diethylaniline, 2,4-diethylaniline, 2,5-diethylaniline, 2,6-diethylaniline, 3,4-diethylaniline, 3,5-diethylaniline, 2,3,4-triethylaniline, 2,3,5-triethylaniline, 2,3,6-triethylaniline, 2,4,6-triethylaniline, 3,4,5-triethylaniline, 2,3,4,5-tetraethylaniline, 2,3,4,6-tetraethylaniline, 2,3,5,6-tetraethylaniline and pentaethylaniline; an aniline compound obtained by changing "ethyl" in the above aniline compound to "n-propyl", "isopropyl", "n-butyl", "sec-butyl", "tert-butyl", "n-pentyl", "neopentyl", "n-hexyl", "n-octyl", "n-decyl", "n-dodecyl" or "n-tetradecyl"; a halogenated aniline compound such as 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline and pentafluoroaniline; a (halogenated alkyl)aniline compound such as 2-(trifluoromethyl)aniline, 3-(trifluoromethyl)aniline, 4-(trifluoromethyl) aniline, 2,6-di(trifluoromethyl)aniline, 3,5-di(trifluoromethyl)aniline, 2,4,6-tri(trifluoromethyl)aniline; and an aniline compound obtained by changing "fluoro" in the above compounds to "chloro", "bromo" or "iodo".

The compound (c) is preferably water, hydrogen sulfide, methylamine, ethylamine, n-propylamine, isopropylamine, n-butylamine, sec-butylamine, tert-butylamine, isobutylamine, n-octylamine, aniline, 2,6-xylylamine, 2,4,6-trimethylaniline, naphthylamine, anthracenylamine, benzylamine, trifluoromethylamine, pentafluoroethylamine, perfluoropropylamine, perfluorobutylamine, perfluoropentylamine, perfluorohexylamine, perfluorooctylamine, perfluorododecylamine, perfluoropentadecylamine, perfluoroeicosylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl)aniline, 2,6-bis(trifluoromethyl)aniline, 3,5-bis(trifluoromethyl)aniline or 2,4,6-tris(trifluoromethyl)aniline; particularly preferably water, trifluoromethylamine, perfluorobutylamine, perfluorooctylamine, perfluoropentadecylamine, 2-fluoroaniline, 3-fluoroaniline, 4-fluoroaniline, 2,6-difluoroaniline, 3,5-difluoroaniline, 2,4,6-trifluoroaniline, 3,4,5-trifluoroaniline, pentafluoroaniline, 2-(trifluoromethyl)aniline, 3-(trifluoromethyl)aniline, 4-(trifluoromethyl) aniline, 2,6-bis(trifluoromethyl)aniline, 3,5-bis(trifluoromethyl)aniline or 2,4,6-tris(trifluoromethyl)aniline; and most preferably water or pentafluoroaniline.

The above particulate inorganic oxide (d) is preferably a porous material having a uniform particle diameter, which is generally used as a carrier. Regarding its particle diameter distribution, a volume-based geometric standard deviation of a particle diameter of the particulate inorganic oxide (d) is preferably 2.5 or less, more preferably 2.0 or less, and further preferably 1.7 or less, from a viewpoint of a particle diameter distribution of an addition polymer produced.

The above particulate inorganic oxide (d) is not particularly limited in its kind, and may be a combination of two or more of particulate inorganic oxides. Examples of the particulate inorganic oxide (d) are $SiO_2$, $Al_2O_3$, MgO, $ZrO_2$, $TiO_2$, $B_2O_3$, CaO, ZnO, BaO and $ThO_2$; a mixture of two or more of those metal oxides; and a composite metal oxide such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Among them preferred is $SiO_2$ and/or $Al_2O_3$, and particularly preferred is $SiO_2$ (silica). The above inorganic oxides may contain a small amount of carbonate, sulfate, nitrate or oxide components, such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$.

The particulate inorganic oxide (d) is preferably dried to contain substantially no water, preferably by a heat-drying method. Its drying temperature is generally 100 to 1,500° C., preferably 100 to 1,000° C., and further preferably 200 to 800° C. for an inorganic oxide containing invisible water. Its drying time is not particularly limited, and is preferably 10 minutes to 50 hours, and more preferably 1 to 30 hours. Examples of the heat-drying method are a method comprising a step of heating an inorganic oxide while passing dried inert gas such as nitrogen gas and argon gas at a constant flow rate, and a method comprising a step of heating an inorganic oxide under reduced pressure.

While an inorganic oxide generally has a hydroxyl group on its surface, the inorganic oxide may be modified by replacing an active hydrogen atom of the hydroxyl group with a substituent contained in a modifier. Examples of the modifier are a trialkylchlorosilane, such as trimethylchlorosilane and tert-butyldimethylchlorosilane; a triarylchlorosilane such as triphenylchlorosilane; a dialkyldichlorosilane such as dimethyldichlorosilane; a diaryldichlorosilane such as diphenyldichlorosilane; an alkyltrichlorosilane such as methyltrichlorosilane; an aryltrichlorosilane such as phenyltrichlorosilane; a trialkylalkoxysilane such as trimethylmethoxysilane; a triarylalkoxysilane such as triphenylmethoxysilane; a dialkyldialkoxysilane such as dimethyldimethoxysilane; a diaryldialkoxysilane such as diphenyldimethoxysilane; an alkyltrialkoxysilane such as methyltrimethoxysilane; an aryltrialkoxysilane such as phenyltrimethoxysilane; a tetraalkoxysilane such as tetramethoxysilane; an alkyldisilazane such as 1,1,1,3,3,3-hexamethyldisilazane; tetrachlorosilane; an alcohol such as methanol and ethanol; phenol; a dialkylmagnesium such as dibutylmagnesium, butylethylmagnesium and butyloctylmagnesium; and an alkyllithium such as butyllithium. Also, an inorganic oxide can be modified by a method comprising steps of contacting the inorganic oxide with a trialkylaluminum to form a contact product, and further contacting the contact product with an amine compound such as diethylamine and diphenylamine, or an alcohol such as methanol and ethanol, or phenol.

Regarding the above modification of an inorganic oxide, when all of an active hydrogen atom of a hydroxyl group is replaced with a substituent contained in a modifier, the inorganic oxide may be decreased in its strength, because of decrease of a hydrogen bond between the hydroxyl groups. Therefore, a degree of the above replacement may be suitably determined. A method for changing the degree of the replacement is not particularly limited. An example thereof is a method of changing a used amount of a modifier.

The particulate inorganic oxide (d) is not particularly limited in its average particle diameter. Its average particle diameter is generally 1 to 5,000 µm, preferably 5 to 1,000 µm, more preferably 10 to 500 µm, and further preferably 10 to 100 µm. Its pore volume is preferably 0.1 mL/g or more, and more preferably 0.3 to 10 mL/g. Its specific surface area is preferably 10 to 1,000 m$^2$/g, and more preferably 100 to 500 m$^2$/g.

The above particulate organic polymer (d) is not particularly limited in its kind, and may be a combination of two or more of organic polymers. The organic polymer has preferably an active hydrogen atom-containing functional group, or a functional group of a non-proton-donating Lewis base.

The above active hydrogen atom-containing functional group is not particularly limited in its kind, as far as it has an active hydrogen atom. Examples of the active hydrogen atom-containing functional group are a primary amino group, a secondary amino group, an imino group, an amide group, a hydrazide group, an amidino group, a hydroxy group, a hydroperoxy group, a carboxyl group, a formyl group, a carbamoyl group, a sulfonic acid group, a sulfinic acid group, a sulfenic acid group, a thiol group, a thioformyl group, a pyrrolyl group, an imidazolyl group, a piperidyl group, an indazolyl group, and a carbazolyl group. Among them, preferred is a primary amino group, a secondary amino group, an imino group, an amide group, an imide group, a hydroxyl group, a formyl group, a carboxyl group, a sulfonic acid group, or a thiol group; and particularly preferred is a primary amino group, a secondary amino group, an amide group or a hydroxy group. These groups may be substituted with a halogen atom or a hydrocarbyl group having 1 to 20 carbon atoms.

The above functional group of a non-proton-donating Lewis base is not particularly limited in its kind, as far as it is a functional group having a Lewis base portion containing no active hydrogen atom. Examples of such a functional group are a pyridyl group, an N-substituted imidazolyl group, an N-substituted indazolyl group, a nitrile group, an azido group, an N-substituted imino group, an N,N-substituted amino group, an N,N-substituted aminooxy group, an N,N,N-substituted hydrazino group, a nitoroso group, a nitro group, a nitrooxy group, a furyl group, a carbonyl group, a thiocarbonyl group, an alkoxy group, an alkyl oxycarbonyl group, an N,N-substituted carbamoyl group, a thioalkoxy group, a substituted sulfinyl group, a substituted sulfonyl group, and a substituted sulfonic acid group. Among them, preferred is heterocyclic group; further preferred is an aromatic heterocyclic group having an oxygen atom and/or a nitrogen atom in its ring; particularly preferred is a pyridyl group, an N-substituted imidazolyl group or an N-substituted indazolyl group; and most preferred is a pyridyl group. These groups may be substituted with a halogen atom or a hydrocarbyl group having 1 to 20 carbon atoms.

The particulate organic polymer (d) is not particularly limited in a content of the active hydrogen atom-containing functional group or the functional group of a non-proton-donating Lewis base. The content is preferably 0.01 to 50 mmol/g, and more preferably 0.1 to 20 mmol/g, in terms of a molar amount of the functional group per one gram of the particulate organic polymer (d).

Examples of a production process of the above organic polymer having an active hydrogen atom-containing functional group, or a functional group of a non-proton-donating Lewis base are (1) a process comprising a step of homopolymerizing a monomer having (1-1) an active hydrogen atom-containing functional group, or a functional group of a non-proton-donating Lewis base, and (1-2) one or more polymerizable unsaturated groups, and (2) a process comprising a step of copolymerizing the above-mentioned monomer with one or more other monomers having a polymerizable unsaturated group. The respective monomers used in production processes (1) and (2) are preferably combined with a cross-linking monomer having two or more polymerizable unsaturated groups. Examples of the polymerizable unsaturated group are an alkenyl group such as a vinyl group and an allyl group, and an alkynyl group such as an ethyne group.

Examples of the above monomer having an active hydrogen atom-containing functional groups, and one or more polymerizable unsaturated groups are a vinyl group-containing primary amine, a vinyl group-containing secondary amine, a vinyl group-containing amide, and a vinyl group-containing hydroxy compound. Specific examples thereof are N-(1-ethenyl)amine, N-(2-propenyl)amine, N-(1-ethenyl)-N-methylamine, N-(2-propenyl)-N-methylamine, 1-ethenylamide, 2-propenylamide, N-methyl-(1-ethenyl)amide, N-methyl-(2-propenyl)amide, vinyl alcohol, 2-propen-1-ol, and 3-buten-1-ol. Examples of the above monomer having a functional group of a non-proton-donating Lewis base, and one or more polymerizable unsaturated groups are vinylpyridine, vinyl(N-substituted)imidazole and vinyl(N-substituted)indazole. Examples of the above other monomer having a polymerizable unsaturated group used in production process (2) are ethylene; an α-olefin such as propylene, 1-butene, 1-hexene, and 4-methyl-1-pentene; an aromatic vinyl compound such as styrene; and a cyclic olefin such as norbornene and dicyclopentadiene.

Examples of the cross-linking monomer are 1,4-divinylbenzene, 1,3-divinylbenzene, 1,3-butadiene, 1,5-hexadiene, 1,7-octadiene and 2,5-norbornadiene.

The particulate organic polymer (d) is not particularly limited in its average particle diameter, which is generally 1 to 5,000 μm, preferably 5 to 1,000 μm, and more preferably 10 to 500 μm, and is not particularly limited in its pore volume, which is preferably 0.1 mL/g or more, and more preferably 0.3 to 10 mL/g, and is not particularly limited in its specific surface area, which is preferably 10 to 1,000 m$^2$/g, and more preferably 50 to 500 m$^2$/g.

The particulate organic polymer (d) is preferably dried to contain substantially no water, preferably by a heat-drying method. Its drying temperature is generally 30 to 400° C., preferably 50 to 200° C., and further preferably 70 to 150° C. for an organic polymer containing invisible water. Its drying time is not particularly limited, and is preferably 10 minutes to 50 hours, and more preferably 1 to 30 hours. Examples of the heat-drying method are a method comprising a step of heating an organic polymer while passing dried inert gas such as nitrogen gas and argon gas at a constant flow rate, and a method comprising a step of heating an organic polymer under reduced pressure.

Above compounds (a), (b) and (c) and particle (d) are not particularly limited in their mutual contact order. Examples of the mutual contact order are following orders (1) to (12), compounds (a), (b) and (c) and particulate inorganic oxide (d) or particulate organic polymer (d) being abbreviated hereinafter to (a), (b), (c) and (d), respectively:

(1) an order which comprises steps of (1-1) contacting (a) with (b) to produce a first contact product, (1-2) contacting the first contact product with (c) to produce a second contact product, and (1-3) contacting the second contact product with (d);

(2) an order which comprises steps of (2-1) contacting (a) with (b) to produce a first contact product, (2-2) contacting the first contact product with (d) to produce a second contact product, and (2-3) contacting the second contact product with (c);

(3) an order which comprises steps of (3-1) contacting (a) with (c) to produce a first contact product, (3-2) contacting the first contact product with (b) to produce a second contact product, and (3-3) contacting the second contact product with (d);

(4) an order which comprises steps of (4-1) contacting (a) with (c) to produce a first contact product, (4-2) contacting the first contact product with (d) to produce a second contact product, and (4-3) contacting the second contact product with (b);

(5) an order which comprises steps of (5-1) contacting (a) with (d) to produce a first contact product, (5-2) contacting the first contact product with (b) to produce a second contact product, and (5-3) contacting the second contact product with (c);

(6) an order which comprises steps of (6-1) contacting (a) with (d) to produce a first contact product, (6-2) contacting the first contact product with (c) to produce a second contact product, and (6-3) contacting the second contact product with (b);

(7) an order which comprises steps of (7-1) contacting (b) with (c) to produce a first contact product, (7-2) contacting the first contact product with (a) to produce a second contact product, and (7-3) contacting the second contact product with (d);

(8) an order which comprises steps of (8-1) contacting (b) with (c) to produce a first contact product, (8-2) contacting the first contact product with (d) to produce a second contact product, and (8-3) contacting the second contact product with (a);

(9) an order which comprises steps of (9-1) contacting (b) with (d) to produce a first contact product, (9-2) contacting the first contact product with (a) to produce a second contact product, and (9-3) contacting the second contact product with (c);

(10) an order which comprises steps of (10-1) contacting (b) with (d) to produce a first contact product, (10-2) contacting the first contact product with (c) to produce a second contact product, and (10-3) contacting the second contact product with (a);

(11) an order which comprises steps of (11-1) contacting (c) with (d) to produce a first contact product, (11-2) contacting the first contact product with (a) to produce a second contact product, and (11-3) contacting the second contact product with (b); and

(12) an order which comprises steps of (12-1) contacting (c) with (d) to produce a first contact product, (12-2) contacting the first contact product with (b) to produce a second contact product, and (12-3) contacting the second contact product with (a).

Among them, preferred is the order (1), (2), (3), (5), (11) or (12), and particularly preferred is the order (2) or (5).

The contact is preferably carried out in an inert gas atmosphere, at a contact temperature of generally −100 to 300° C., and preferably −80 to 200° C., for a contact time of generally 1 minute to 200 hours, and preferably 10 minutes to 100 hours, with or without the use of a solvent.

The above "contact time" is defined below with reference to above contact order (1) as an example. In contact order (1), step (1-1) contacts (a) with (b) for a contact time of $T^1$ to produce a first contact product; step (1-2) contacts the first contact product with (c) for a contact time of $T^2$ to produce a second contact product; and step (1-3) contacts the second contact product with (d) for a contact time of $T^3$. Therefore, the above "contact time" is defined as the total time of $T^1$, $T^2$ and $T^3$.

The above solvent is a solvent inert to (a), (b), (c), (d), and the above first and second contact product. However, the above tree contact steps such as steps (1-1) to (1-3) in contact order (1) may be different from one another in their solvents used, as long as those solvents are inert in the three contact steps, respectively. Examples of the solvent are a non-polar solvent such as an aliphatic hydrocarbon solvent and an aromatic hydrocarbon solvent; and a polar solvent such as a halide solvent, an ether solvent, an alcohol solvent, a phenol solvent, a carbonyl solvent, a phosphoric acid derivative, a nitrile solvent, a nitro compound, an amine solvent and a sulfur compound. Specific examples thereof are an aliphatic hydrocarbon solvent such as butane, pentane, hexane, heptane, octane, 2,2,4-trimethylpentane and cyclohexane; an aromatic hydrocarbon solvent such as benzene, toluene and xylene; a halide solvent such as dichloromethane, difluoromethane, chloroform, 1,2-dichloroethane, 1,2-dibromoethane, 1,1,2-trichloro-1,2,2-trifluoroethane, tetrachloroethylene, chlorobenzene, bromobenzene and o-dichlorobenzene; an ether solvent such as dimethyl ether, diethyl ether, diisopropyl ether, di-n-butyl ether, methyl-tert-butyl-ether, anisole, 1,4-dioxane, 1,2-dimethoxy ethane, bis(2-methoxyethyl)ether, tetrahydrofuran and tetrahydropyran; an alcohol solvent such as methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol and glycerin; a phenol solvent such as phenol and p-cresol; a carbonyl solvent such as acetone, ethyl methyl ketone, cyclohexanone, acetic anhydride, ethyl acetate, butyl acetate, ethylene carbonate, propylene carbonate, N,N-dimethylformamide, N,N-dimethylacetoamide and N-methyl-2-pyrrolidone; a phosphoric acid derivative such as hexamethylphosphate triamide and triethyl phosphate; a nitrile solvent such as acetonitrile, propionitrile, succinonitrile and benzonitrile; a nitro compound such as nitromethane and nitrobenzene; an amine solvent such as pyridine, piperidine and morpholine; and a sulfur compound such as dimethylsulfoxide and sulfolane.

In above contact orders (1), (3) and (7), wherein the second contact product is contacted with (d), the first and second contact steps use preferably an aliphatic hydrocarbyl solvent, an aromatic hydrocarbyl solvent, or an ether solvent, and the third contact step uses preferably a polar solvent.

As an index indicating a polarity of the above polar solvent, there is known in the art the ETN value (C. Reichardt, "Solvents and Solvents Effects in Organic Chemistry", 2nd ed., VCH Verlag (1988)). In the present invention, a polar solvent satisfying $0.1 \leq ETN \leq 0.8$ is particularly preferable. Examples of such a polar solvent are dichloromethane, dichlorodifluoromethane chloroform, 1,2-dichloroethane, 1,2-dibromoethane, 1,1,2-trichloro-1,2,2-trifluoroethane, tetrachloroethylene, chlorobenzene, bromobenzene, o-dichlorobenzene, dimethyl ether, diethyl ether, diisopropyl ether, di-n-butyl ether, methyl tert-butyl ether, anisole, 1,4-dioxane, 1,2-dimethoxy ethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol, triethylene glycol, acetone, ethyl methyl ketone, cyclohexanone, acetic anhydride, ethyl acetate, butyl acetate, ethylene carbonate, propylene carbonate, N,N-dimethylformamide, N,N-dimethylacetoamide, N-methyl-2-pyrrolidone, hexamethylphosphate triamide, triethyl phosphate, acetonitrile, propionitrile, succinonitrile, benzonitrile, nitromethane, nitrobenzene, ethylenediamine, pyridine, piperidine, morpholine, dimethylsulfoxide, and sulfolane. Among them, preferred is dimethyl ether, diethyl ether, diisopropyl ether, di-n-butyl ether, methyl tert-butyl ether, anisole, 1,4-dioxane, 1,2-dimethoxyethane, bis(2-methoxyethyl)ether, tetrahydrofuran, tetrahydropyran, methanol, ethanol, 1-propanol, 2-propanol, 1-butanol, 2-butanol, 2-methyl-1-propanol, 3-methyl-1-butanol, cyclohexanol, benzyl alcohol, ethylene glycol, propylene glycol, 2-methoxyethanol, 2-ethoxyethanol, diethylene glycol or triethylene glycol; particularly preferred is di-n-butyl ether, methyl tert-butyl ether, 1,4-dioxane, tetrahydrofuran, methanol, ethanol, 1-propanol, 2-propanol, 1-butanol, 2-butanol, 2-methyl-1-propanol, 3-methyl-1-butanol or cyclohexanol; and most preferred is tetrahydrofuran, methanol, ethanol, 1-propanol or 2-propanol.

The above polar solvent used in the third contact step may be combined with a hydrocarbyl solvent (namely, a mixed solvent of a polar solvent with a hydrocarbyl solvent). Examples of the hydrocarbyl solvent are the above-exemplified aliphatic hydrocarbyl solvents and aromatic hydrocarbyl solvents. Examples of the mixed solvent are a hexane/methanol mixed solvent, a hexane/ethanol mixed solvent, a hexane/1-propanol mixed solvent, a hexane/2-propanol mixed solvent, a heptane/methanol mixed solvent, a heptane/ethanol mixed solvent, a heptane/1-propanol mixed solvent, a heptane/2-propanol mixed solvent, a toluene/methanol mixed solvent, a toluene/ethanol mixed solvent, a toluene/1-propanol mixed solvent, a toluene/2-propanol mixed solvent, a xylene/methanol mixed solvent, a xylene/ethanol mixed solvent, a xylene/1-propanol mixed solvent, and a xylene/2-propanol mixed solvent. Among them, preferred is a hexane/methanol mixed solvent, a hexane/ethanol mixed solvent, a heptane/methanol mixed solvent, a heptane/ethanol mixed solvent, a toluene/methanol mixed solvent, toluene/ethanol mixed solvent, a xylene/methanol mixed solvent or a xylene/ethanol mixed solvent; more preferred is a hexane/methanol mixed solvent, a hexane/ethanol mixed solvent, a toluene/methanol mixed solvent or a toluene/ethanol mixed solvent; and most preferred is a toluene/ethanol mixed solvent containing 50 to 90% by volume, and preferably 70 to 85% by volume of toluene, and 10 to 50% by volume, and preferably 15 to 30% by volume of ethanol, provided that the total of toluene and ethanol is 100% by volume.

In above contact orders (1), (3) and (7), wherein the second contact product is contacted with (d) in the third contact step, not only the first and second contact steps but also the third contact step may use a hydrocarbyl solvent. However, an interval between the ending point of the second contact step and the starting point of the third contact step is preferably short. The interval is preferably 0 to 5 hours, more preferably 0 to 3 hours, and most preferably 0 to 1 hour. The third contact step, wherein the second contact product is contacted with (d), is carried out at generally −100 to 40° C., preferably −20 to 20° C., and most preferably −10 to 10° C.

In above contact orders (2), (5), (6), (8), (9), (10), (11) and (12), the first, second and third contact steps may use both a non-polar solvent and a polar solvent. Among them, preferred is a non-polar solvent, for the following possible reasons. It is desirable in the present invention that the contact product formed by a mutual contact of (a), (b) and (c) is supported on (d). The following contact products (i) and (ii) are smaller in their solubility in a non-polar solvent than in a polar solvent:
  (i) a contact product of (a) with (c); and
  (ii) a contact product of (c) with a contact product, which is formed by contacting (a) with (b);
and therefore, when above contact product (i) or (ii) is formed in the presence of (d), contact product (i) or (ii) is precipitated in a non-polar solvent, and is supported on the surface (d).

The compounds (a), (b) and (c) are not particularly limited in their used amount, which is preferably defined by following formula (1):

$$|m-y-2z|<1 \qquad (1)$$

wherein m is a valence of $M^1$; y and z are a molar amount of compounds (b) and (c) used, respectively, per one mol of compound (a) used. In formula (1), y is preferably 0.01 to 1.99, more preferably 0.10 to 1.80, further preferably 0.20 to 1.50, and most preferably 0.30 to 1.00, and a value of z corresponding thereto is calculated based on a value of m, a value of y, and formula (1).

The compound (a) and particle (d) are used in such an amount that one gram of the obtained modified particle contains a typical metal derived from compound (a), in an amount of preferably 0.05 mmol or more, and more preferably 0.1 to 20 mmol.

The final contact product obtained in above contact orders (1) to (12) is preferably heated at higher temperature than temperature in each contact of contact orders (1) to (12). Therefore, a solvent having high boiling temperature is preferably used. When contact orders (1) to (12) use a solvent having low boiling temperature, the solvent is replaced with a solvent having a high boiling temperature, thereby heating the final contact product at higher temperature.

Although obtained modified particle (I) may contain unreacted compound (a), (b) or (c), or particle (d), it is preferably washed with a solvent, which is the same as, or different from a solvent used in contact orders (1) to (12), preferably in an inert gas atmosphere, at usually −100 to 300° C., and preferably −80 to 200° C., for usually 1 minute to 200 hours, and preferably 10 minutes to 100 hours. When washing modified particle (I), it is preferable to remove an upper part slurry, wherein amorphous particles and fine powdery particles are floating, in order to obtain a modified particle having a uniform particle diameter and a uniform particle shape.

Finally-obtained modified particle (I) is preferably subjected to evaporation to remove a solvent contained therein, and then is preferably dried under reduced pressure preferably at 0° C. or higher for 1 to 24 hours, more preferably at 0 to 200° C. for 1 to 24 hours, further preferably at 10 to 200° C. for 1 to 24 hours, particularly preferably at 10 to 160° C. for 2 to 18 hours, and most preferably at 15 to 160° C. for 4 to 18 hours.

A specific production process of modified particle (I) is explained below, wherein compound (a) is diethylzinc ($M^3$ in formula [3] is a zinc atom), compound (b) is 3,4,5-trifluorophenol, compound (c) is water, and particle (d) is silica: the process comprising steps of (1) adding a hexane solution of diethylzinc to tetrahydrofuran (solvent), (2) cooling the resultant mixture down to 3° C., (3) adding 3,4,5-trifluorophenol drop-wise thereto in an equimolar amount to diethylzinc, (4) stirring the mixture for 10 minutes to 24 hours at room temperature, (5) adding water drop-wise thereto in a half molar amount for diethylzinc, (6) stirring the mixture for 10 minutes to 24 hours at room temperature, (7) distilling away the solvent from the mixture, (8) drying the resultant material at 120° C. for 8 hours under reduced pressure, thereby obtaining a solid component, (9) adding tetrahydrofuran and silica to the solid component, (10) stirring the mixture for 2 hours at 40° C., (11) solid-liquid separating the mixture, (12) washing the separated solid component with tetrahydrofuran, and (13) drying the washed solid component at 120° C. for 8 hours under reduced pressure, thereby obtaining a modified particle.

The above aluminoxane used for producing modified particle (II) is preferably a cyclic aluminoxane represented by formula $\{-Al(E^2)-O-\}_b$ and/or a linear aluminoxane represented by formula $E^3\{-Al(E^3)-O-\}_cAlE^3{}_2$, wherein $E^2$ and $E^3$ are a hydrocarbyl group, and all $E^2$s and all $E^3$s are the same as, or different from one another; b is a number of 2 or more, and preferably 2 to 40; and c is a number of 1 or more, and preferably 1 to 40.

$E^2$ and $E^3$ are preferably a hydrocarbyl group having 1 to 8 carbon atoms, and more preferably an alkyl group. Examples of the alkyl group are a methyl group, an ethyl group, a n-propyl group, an isopropyl group, n-butyl group, an isobutyl group, a n-pentyl group, and a neopentyl group. Among them, preferred is a methyl group or an isobutyl group.

The above aluminoxane can be produced by a production method known in the art. An example thereof is a method comprising a step of contacting water with a solution of a trialkylaluminum (for example, trimethylaluminum) in a suitable organic solvent (for example, benzene and an aliphatic hydrocarbon). An aluminoxane produced by this method is generally thought to be a mixture of a cyclic aluminoxane and a linear aluminoxane.

Particle (d) used for producing modified particle (II) is substantially the same as that used for producing modified particle (I).

In a production process of modified particle (II), a method of contacting an aluminoxane with particle (d) is not particularly limited. An example thereof is a method comprising steps of (1) dispersing particle (d) in a solvent, and then (2) adding thereto an aluminoxane. Examples of the solvent are those exemplified in the above production process of modified particle (I). Among them, preferred is a solvent inert to an aluminoxane, and more preferred is a solvent dissolving an aluminoxane. Among them, preferred is an aromatic hydrocarbon such as toluene and xylene, or an aliphatic hydrocarbon such as hexane, heptane and octane, and more preferred is toluene or xylene.

A production process of modified particle (II) is not particularly limited in its contact temperature and contact time. The contact temperature is generally −100 to 200° C., preferably −50 to 150° C., and further preferably −20 to 120° C. Its early reaction is particularly carried out preferably at low temperature, in order to inhibit an exothermic reaction. The aluminoxane is not particularly limited in its used amount, which is usually 0.01 to 100 mmol, preferably 0.1 to 20 mmol, and further preferably 1 to 10 mmol, in terms of a molar amount of an aluminum atom contained in an aluminoxane used, per one gram of particle (d).

The above production process of modified particle (III) uses a transition metal compound besides an aluminoxane and particle (d) used in the above production process of modified particle (II). As such a transition metal compound, there is used a transition metal compound represented by above formula [1], or a μ-oxo type dimmer thereof.

The production process of modified particle (III) is not particularly limited in its contact method, and uses preferably a solvent. Examples of the solvent are those exemplified above. Among them, preferred is a solvent inert to an aluminoxane and a transition metal compound, and more preferred is a solvent dissolving an aluminoxane and a transition metal compound. Among them, preferred is an aromatic hydrocarbon such as toluene and xylene, or an aliphatic hydrocarbon such as hexane, heptane and octane, and more preferred is toluene or xylene.

A production process of modified particle (III) is not particularly limited in its contact temperature and contact time. The contact temperature is generally −100 to 200° C., preferably −50 to 150° C., and further preferably −20 to 120° C. Its early reaction is particularly carried out preferably at low temperature, in order to inhibit an exothermic reaction. The aluminoxane is not particularly limited in its used amount, which is usually 0.01 to 100 mmol, preferably 0.1 to 20 mmol, and further preferably 1 to 10 mmol, in terms of a molar amount of an aluminum atom contained in an aluminoxane used, per one gram of particle (d). The transition metal compound is used in an amount of usually 0.1 to 1,000 μmol, preferably 1 to 500 μmol, and further preferably 10 to 200 μmol, in terms of a molar amount of a transition metal atom contained in the transition metal compound used, per one gram of particle (d).

Organometallic Compound

Examples of $M^2$ in formula [2] are a lithium atom, a sodium atom, a potassium atom, a rubidium atom, a cesium atom, a beryllium atom, a magnesium atom, a calcium atom, a strontium atom, and a barium atom. Among them, preferred is a typical metal atom of group 1, more preferred is a lithium atom, a sodium atom, or a potassium atom, and most preferred is a lithium atom.

Examples of the hydrocarbyl group of $L^2$ are those exemplified above as $L^3$ in above formula [3]. Among them, preferred is an alkyl group or an aryl group, and further preferred is an alkyl group. These hydrocarbyl groups may be substituted with a halogen atom.

Examples of the hydrocarbyloxy group of $L^2$ are an alkoxy group such as a methoxy group, an ethoxy group, a propoxy group, a n-butoxy group, an isobutoxy group, and a tert-butoxy group; and an aryloxy group such as a phenoxy group and a 4-methylphenoxy group. These hydrocarbyloxy groups may be substituted with a halogen atom.

Examples of the organometallic compound of a lithium atom are lithium hydride; an alkyllithium such as methyllithium, ethyllithium, n-propyllithium, n-butyllithium, isobutyllithium, tert-butyllithium, and n-hexyllithium; an aryllithium such as phenyllithium, naphthyllithium, and pentafluorophenyllithium; an alkenyllithium such as allyllithium and cyclopentadienyllithium; an alkoxylithium such as methoxylithium, ethoxylithium, propoxylithium, n-butoxylithium, isobutoxylithium, and tert-butoxylithium, and an aryloxylityium such as phenoxylithium and 4-methylphenoxylithium. Among them, preferred is an alkyllithium, further preferred is methyllithium, ethyllithium, n-propyllithium, n-butyllithium, isobutyllithium, tert-butyllithium, or n-hexyllithium, and particularly preferred is ethyllithium, n-butyllithium or tert-butyllithium.

Organoaluminum Compound

The above organoaluminum compound may be a compound known in the art, and is preferably an organoaluminum compound represented by the following formula [8]:

$$R^5{}_d AlY_{3-d} \qquad [8]$$

wherein $R^5$ is a hydrocarbyl group, and plural $R^5$s are the same as, or different from one another; Y is a hydrogen atom, a halogen atom, an alkoxy group, an aralkyloxy group or an aryloxy group, and plural Ys are the same as, or different from each other; and d is a number satisfying $0<d\leqq 3$.

$R^5$ is preferably a hydrocarbyl group having 1 to 24 carbon atoms, and more preferably an alkyl group having 1 to 24 carbon atoms. Examples of the alkyl group are a methyl group, an ethyl group, a n-propyl group, a n-butyl group, an isobutyl group, a n-hexyl group, a 2-methylhexyl group, and a n-octyl group. Among them, preferred is an ethyl group, a n-butyl group, an isobutyl group, a n-hexyl group or a n-octyl group.

Examples of the halogen atom of Y are a fluorine atom, a chlorine atom, a bromine atom, and an iodine atom. Among them, preferred is a chlorine atom.

The alkoxy group of Y is preferably an alkoxy group having 1 to 24 carbon atoms, and examples thereof are a methoxy group, an ethoxy group, a n-propoxy group, an isopropoxy group, an n-butoxy group, a sec-butoxy group, a tert-butoxy group, a n-pentoxy group, a neopentoxy group, a n-hexoxy group, a n-octoxy group, a n-dodecoxy group, a n-pentadecoxy group, and n-eicosoxy group. Among them, preferred is a methoxy group, an ethoxy group or a tert-butoxy group.

The aryloxy group of Y is preferably an aryloxy group having 6 to 24 carbon atoms, and examples thereof are a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, and an anthracenoxy group.

The aralkyloxy group of Y is preferably an aralkyloxy group having 7 to 24 carbon atoms, and examples thereof are a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group and an anthracenylmethoxy group. Among them, preferred is a benzyloxy group.

Examples of the organoaluminum compound represented by formula [8] area trialkylaluminum such as trimethylaluminum, triethylaluminum, tri-n-propylaluminum, tri-n-butylaluminum, triisobutylaluminum, tri-n-hexylaluminum and tri-n-octylaluminum; a dialkylaluminum chloride such as dimethylaluminum chloride, diethylaluminum chloride, di-n-propylaluminum chloride, di-n-butylaluminum chloride, diisobutylaluminum chloride and di-n-hexylaluminum chloride; an alkylaluminum dichloride such as methylaluminum dichloride, ethylaluminum dichloride, n-propylaluminum dichloride, n-butylaluminum dichloride, isobutylaluminum dichloride and n-hexylaluminum dichloride; a dialkylaluminum hydride such as dimethylaluminum hydride, diethylaluminum hydride, di-n-propylaluminum hydride, di-n-butylaluminum hydride, diisobutylaluminum hydride and di-n-hexylaluminum hydride; an alkyl(dialkoxy)aluminum such as methyl(dimethoxy)aluminum, methyl(diethoxy)aluminum and methyl(di-tert-butoxy)aluminum; a dialkyl(alkoxy) aluminum such as dimethyl(methoxy)aluminum, dimethyl (ethoxy) aluminum and dimethyl(tert-butoxy) aluminum; an alkyl(diaryloxy)aluminum such as methyl(diphenoxy)aluminum, methylbis(2,6-diisopropylphenoxy)aluminum and methylbis(2,6-diphenylphenoxy)aluminum; a dialkyl (aryloxy)aluminum such as dimethyl(phenoxy)aluminum, dimethyl(2,6-diisopropylphenoxy)aluminum and dimethyl(2,6-diphenylphenoxy)aluminum; and a combination of two or more thereof. Among them, preferred is trialkyl aluminum; further preferred is trimethylaluminum, triethylaluminum, tri-n-butylaluminum, triisobutylaluminum, tri-n-hexylaluminum, or tri-n-octylaluminum; and particularly preferred is triisobutylaluminum or tri-n-octylaluminum.

Electron Donor Compound

The above "primary catalyst" used in step (2) of the catalyst component production process of the present invention, and the above "pre-polymerized catalyst component for addition polymerization" or "organoaluminum compound" used in the polymer production process of the present invention may be combined with an electron donor compound. The electron donor compound is preferably an oxygen-containing compound, a nitrogen-containing compound, a phosphorus-containing compound or a sulfur-containing compound, and more preferably an oxygen-containing compound or a nitrogen-containing compound.

Examples of the oxygen-containing compound are an alkoxysilicon, an ether, a ketone, an aldehyde, a carboxylic acid, an ester of an organic acid, an ester of an inorganic acid, an amide of an organic acid, an amide of an inorganic acid, and an acid anhydride. Among them, preferred is an alkoxysilicon or an ether. Examples of the above nitrogen-containing compound are an amine, a nitrile and an isocyanate, and among them, preferred is an amine.

The above alkoxysilicon is preferably an alkoxysilicon represented by the following formula:

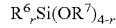

$$R^6_r Si(OR^7)_{4-r}$$

wherein $R^6$ is a hydrogen atom, a hydrocarbyl group having 1 to 20 carbon atoms, or a hetero atom-containing group, and plural $R^6$s are the same as, or different from one another; $R^7$ is a hydrocarbyl group having 1 to 20 carbon atoms, and plural $R^1$s are the same as, or different from one another; and r is a number satisfying $0 \leq r < 4$.

Examples of the hydrocarbyl group of $R^6$ and $R^7$ are a linear alkyl group such as a methyl group, an ethyl group, a propyl group, a butyl group, and a pentyl group; a branched alkyl group such as an isopropyl group, a sec-butyl group, a tert-butyl group and a tert-amyl group; a cycloalkyl group such as a cyclopentyl group and a cyclohexyl group; a cycloalkenyl group such as a cyclopentenyl group; and an aryl group such as a pheny group and a tolyl group.

Examples of the hetero atom of the above hetero atom-containing group are an oxygen atom, a nitrogen atom, a sulfur atom and a phosphor atom. Examples of the hetero atom-containing group of $R^6$ are a dimethylamino group, a methylethylamino group, a diethylamino group, an ethyl-n-propylamino group, a di-n-propylamino group, a pyrrolyl group, a pyridyl group, a pyrrolidinyl group, a piperidyl group, a perhydroindolyl group, a perhydroisoindolyl group, a perhydroquinolyl group, a perhydroisoquinolyl group, a perhydrocarbazolyl group, a perhydroacridinyl group, a furyl group, a pyranyl group, a perhydrofuryl group, and a thienyl group.

The above alkoxysilicon is preferably an alkoxysilicon having alkyl groups as $R^6$ and $R^7$, and is more preferably an alkoxysilicon having r satisfying $2 \leq r < 4$.

Examples of the alkoxysilicon are tetramethoxysilane, methyltrimethoxysilane, ethyltrimethoxysilane, n-propyltrimethoxysilane, isopropyltrimethoxysilane, n-butyltrimethoxysilane, isobutyltrimethoxysilane, sec-butyltrimethoxysilane, tert-butyltrimethoxysilane, n-pentyltrimethoxysilane, n-hexyltrimethoxysilane, tert-amyltrimethoxysilane, dimethyldimethoxysilane, diethyldimethoxysilane, di-n-butyldimethoxysilane, diisobutyldimethoxysilane, di-tert-butyldimethoxysilane, methylethydimethoxysilane, methyl-n-propyldimethoxysilane, methyl-n-butyldimethoxysilane, methylisobutyldimethoxysilane, tert-butylmethyldimethoxysilane, tert-butylethyldimethoxysilane, tert-butyl-n-propyldimethoxysilane, tert-butylisopropyldimethoxysilane, tert-butyl-n-butyldimethoxysilane, tert-butylisobutyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, dicyclobutyldimethoxysilane, cyclobutylmethyldimethoxysilane, cyclobutylethyldimethoxysilane, cyclobutylisopropyldimethoxysilane, cyclobutyl-n-butyldimethoxysilane, cyclobutylisobutyldimethoxysilane, cyclobutyl-tert-butyldimethoxysilane, dicyclopentyldimethoxysilane, cyclopentylmethyldimethoxysilane, cyclopentyl-n-propyldimethoxysilane, cyclopentylisopropyldimethoxysilane, cyclopentyl-n-butyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexyl-n-propyldimethoxysilane, cyclohexylisopropyldimethoxysilane, cyclohexyl-n-butyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylethyldimethoxysilane, phenyl-n-propyldimethoxysilane, phenylisopropyldimethoxysilane, phenyl-n-butyldimethoxysilane, phenylisobutyldimethoxysilane, phenyl-tert-butyldimethoxysilane, phenylcyclopentyldimethoxysilane, 2-norbornanemethyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino) methyldimethoxysilane, (perhydroquinolino) ethyldimethoxysilane, (perhydroisoquinolino) ethyldimethoxysilane, (perhydroquinolino)(n-propyl) dimethoxysilane, (perhydroisoquinolino)(n-propyl) dimethoxysilane, (perhydroquinolino)(tert-butyl) dimethoxysilane, (perhydroisoquinolino)(tert-butyl) dimethoxysilane, trimethylmethoxysilane, triethylmethoxysilane, tri-n-propylmethoxysilane, triisopropylmethoxysilane, tri-n-butylmethoxysilane, triisobutylmethoxysilane and tri-tert-butylmethoxysilane; and compounds formed by changing "methoxy" contained in the above compounds to "ethoxy", "propoxy", "n-butoxy", "isobutoxy", "tert-butoxy" or "phenoxy". Among them, preferred is a dialkyldialkoxysilane or a trialkylmonoalkoxysilane, and more preferred is a trialkylmonoalkoxysilane.

Examples of the above ether are a dialkyl ether, an alkyl aryl ether, a diaryl ether, a diether, a cyclic ether and a cyclic diether. Specific examples thereof are dimethyl ether, diethyl ether, di-n-propyl ether, diisopropyl ether, di-n-butyl ether, diisobutyl ether, di-tert-butyl ether, dicyclohexyl ether, diphenyl ether, methyl ethyl ether, methyl n-propyl ether, methyl isopropyl ether, methyl n-butyl ether, methyl isobutyl ether, methyl tert-butyl ether, methyl cyclohexyl ether, methyl phenyl ether, ethylene oxide, propylene oxide, oxetane (trimethylene oxide), tetrahydrofuran, 2,5-dimethyltetrahydrofuran, tetrahydropyrane, 1,2-dimethoxyethane, 1,2-diethoxyethane, 1,2-diisobutoxyethane, 2,2-dimethoxypropane, 1,3-dimethoxypropane, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane, 1,2-dimethoxybenzene, 1,3-dimethoxybenzene, 1,4-dimethoxybenzene, 1,3-dioxolan, 1,4-dioxane, and 1,3-dioxane. Among them, preferred is diethyl ether, di-n-butyl ether, methyl n-butyl ether, methyl phenyl ether, tetrahydrofuran, 1,3-dioxane, 1,4-dioxane or 1,3-dioxolan, and more preferred is diethyl ether, di-n-butyl ether or tetrahydrofuran.

Examples of the above ester of an organic acid are an ester of a mono carboxylic acid and an ester of a poly-carboxylic acid, such as an ester of a saturated aliphatic carboxylic acid, an ester of an unsaturated aliphatic carboxylic acid, an ester of an alicyclic carboxylic acid, and an ester of an aromatic carboxylic acid. Specific examples thereof are methyl acetate, ethyl acetate, n-butyl acetate, isobutyl acetate, tert-butyl acetate, phenyl acetate, methyl propionate, ethyl propionate, ethyl butyrate, ethyl valerate, ethyl acrylate, methyl methacrylate, methyl benzoate, ethyl benzoate, n-butyl benzoate, isobutyl benzoate, tert-butyl benzoate, methyl toluate, ethyl toluate, methyl anisate, ethyl anisate, dimethyl succinate, diethyl succinate, di-n-butyl succinate, dimethyl malonate, diethyl malonate, di-n-butyl malonate, dimethyl maleate, dibutyl maleate, diethyl itaconate, di-n-butyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-tert-butyl phthalate, dipentyl phthalate, di-n-hexyl phthalate, diheptyl phthalate, di-n-octyl phthalate, di(2-ethylhexyl) phthalate, diisodecyl phthalate, dicyclohexyl phthalate, diphenyl phthalate, dimethyl isophthalate, diethyl isophthalate, di-n-butyl isophthalate, diisobutyl isophthalate, di-tert-butyl isophthalate, dimethyl terephthalate, diethyl terephthalate, di-n-butyl terephthalate, diisobutyl terephthalate and di-tert-butyl terephthalate. Among them, preferred is methyl acetate, ethyl acetate, methyl benzoate, ethyl benzoate, dimethyl phthalate, diethyl phthalate, di-n-butyl phthalate, diisobutyl phthalate, dimethyl terephthalate, diethyl terephthalate, and more preferred is methyl benzoate, dimethyl phthalate, diethyl phthalate, diisobutyl phthalate or dimethyl terephthalate.

An example of the above amine is a trihydrocarbylamie such as trimethylamine, triethylamine, tri-n-propylamine, triisopropylamine, tri-n-butylamine, triisobutylamine, tri-n-octylamine, tirdodecylamine, triphenylamine, dimethylethylamine, dimethyl-n-propylamine, dimethylisopropylamine, dimethyl-n-butylamine, dimethylisobutylamine, dimethyl-n-octylamine, dimethyldodecylamine, dimethylphenylamine, methyldiethylamine, methyl-di(n-propyl)amine, methyldiisopropylamine, methyl-di(n-butyl)amine, methyldiisobutylamine, methyl-di(n-octyl)amine, methyldidodecylamine and methyldiphenylamine. Among them, preffered is triethylamine or tri-n-octylamine.

The electron donor compound is preferably an alkoxysilicon, an ether or an amine, and more preferably an amine. The electron donor compound is used singly, or in combination of two or more thereof.

Primary Polymerization Catalyst

The above "transition metal compound represented by formula [1], or a μ-oxo dimmer thereof", "activation agent", "organometallic compound represented by formula [2]" and "organoaluminum compound", which are recited in step (1) of the catalyst component production process, are referred to hereinafter as "component (A)", "component (B)", "component (C)" and "component (D)", respectively.

Component (A) is used in an amount of usually 0.1 to 1,000 μmol, preferably 1 to 500 μmol, and more preferably 10 to 300 μmol, per one gram of component (B). Component (C) is used in an amount of usually 0.01 to 100 mol, preferably 0.05 to 50 mol, and more preferably 0.1 to 10 mol, per one mol of component (A). Component (D) is used in an amount of usually 0.01 to 10,000 mmol, preferably 0.1 to 1,000 mmol, and more preferably 0.5 to 200 mmol, per one gram of component (A).

Examples of a method for feeding components (A), (B), (C) and (D) to a pre-polymerization reactor, wherein a primary catalyst is formed, are (1) a method comprising steps of (1-1) contacting components (A), (B), (C) and (D) with one another, thereby forming a contact product, and then (1-2) feeding the contact product to the pre-polymerization reactor, (2) a method comprising a step of feeding components (A), (B), (C) and (D) separately to the pre-polymerization reactor, thereby contacting them in the pre-polymerization reactor, (3) a method comprising steps of (3-1) contacting any two or more of components (A), (B), (C) and (D) with one another, thereby forming a contact product, and then (3-2) feeding the contact product and the remaining component separately to the pre-polymerization reactor, and (4) a method comprising steps of (4-1) feeding components (A) and (C) to the pre-polymerization reactor, thereby forming a contact product, and then (4-2) feeding remaining component (B) and optional component (D) thereto. Among them, preferred is method (2) or (4), and particularly preferred is method (4), in order to prevent the above-mentioned fouling, and in order to improve a polymerization activity in the polymer production process of the present invention. Regarding above method (4), its first embodiment comprises steps of (i) feeding components (A) and (C) to the pre-polymerization reactor, thereby forming a contact product, and then (ii) feeding component (B) thereto, thereby contacting the contact product with component (B); and its second embodiment comprises steps of (i) feeding components (A) and (C) to the pre-polymerization reactor, thereby forming a first contact product, (ii) feeding component (B) thereto, thereby contacting the first contact product with component (B) to form a second contact produce, and (iii) feeding component (D) thereto, thereby contacting the second contact product with component (D). Component (A) is fed to a pre-polymerization reactor in its powdered state, or in its slurry state suspended in a solvent.

Components (A), (B), (C) and (D) are contacted with one another preferably under stirring, with or without the use of a solvent. It is preferable to use a solvent in order to form an active site effectively on the obtained primary catalyst. The solvent is not limited in its kind, as long as it does not deactivate an active site, and is preferably a solvent dissolving component (A). Examples of the solvent are an aliphatic hydrocarbon solvent such as butane, pentane, hexane, and octane; an aromatic hydrocarbon solvent such as benzene, toluene and xylene; a halogenated hydrocarbon solvent such as dichloromethane; and a polar solvent such as an ether, an ester and a ketone. Among them, preferred is an aliphatic hydrocarbon solvent, because it is preferable that the pre-polymerized catalyst component produced in step (2) of the catalyst component production process of the present invention does not dissolve in a solvent used in step (2).

Step (1) of the catalyst component production process of the present invention is not particularly limited in its contact temperature and contact time. The contact temperature is usually −50 to 100° C., preferably −30 to 80° C., and further preferably −10 to 60° C. The contact time is usually 0 minute (substantially) to 24 hours, preferably 1 minute to 3 hours, and further preferably 3 minutes to 2 hours.

Pre-Polymerization

The pre-polymerization in step (2) of the catalyst component production process of the present invention is not particularly limited in its polymerization type, and is preferably solution or slurry polymerization using a solvent, which may be the same as a polymerization solvent used in the polymer production process of the present invention. Examples of the polymerization solvent are an aliphatic hydrocarbon solvent such as butane, pentane, hexane, heptane, and octane; an aromatic hydrocarbon solvent such as benzene and toluene; and a halogenated hydrocarbon solvent such as dichloromethane. Also, it is possible to use a monomer itself as a polymerization solvent, such as ethylene, propylene, 1-butene, and 1-hexene.

The pre-polymerization is batch-wise polymerization or continuous polymerization, and may contain two or more polymerization steps different from one another in their polymerization conditions. A polymerization time of the pre-polymerization is suitably determined depending on a condition such as a type of an olefin pre-polymerized and a pre-polymerization reactor, and is usually 1 minute to 20 hours. Polymerization temperature of the pre-polymerization is usually −50 to 100° C., preferably −30 to 80° C., and further preferably −10 to 60° C., and may be changed in its mid-course. Polymerization pressure of the pre-polymerization is usually 0.001 to 5 MPa, and preferably 0.01 to 2 MPa. The pre-polymerization may use a molecular weight regulator such as hydrogen, in order to regulate molecular weight of a pre-polymer.

The pre-polymerization is not particularly limited in its method for feeding an olefin to a pre-polymerization reactor. The pre-polymerization uses an olefin having usually 2 to 20 carbon atoms. Examples thereof are ethylene, propylene, 1-butene, 1-pentene, 1-hexene, 1-heptene, 1-octene, 1-nonene, 1-decene, 4-methyl-1-pentene, 4-methyl-2-pentene, and vinylcyclohexane; and a combination of two or more thereof. Examples of the combination are ethylene-propylene, ethylene-1-butene, ethylene-1-hexene, and propylene-1-butene.

When the pre-polymerization is carried out by slurry polymerization, the obtained slurry containing a pre-polymerized catalyst component is used for the polymer production process, without modification of the slurry, or with modification of the slurry, the modification comprising steps of (1) removing a monomer and a solvent from the slurry, (2) solid-liquid separating, (3) washing the separated solid, and (4) drying the washed solid, thereby obtaining a solid pre-polymerized catalyst component, which is used for the polymer production process of the present invention.

The pre-polymerization produces a pre-polymer in an amount of usually 0.1 to 1,000 g, preferably 0.5 to 500 g, and particularly preferably 1 to 100 g, per one gram of the activation agent, the above "amount" being referred to as a "degree of pre-polymerization".

Polymer Production Process

While the above pre-polymerized catalyst component is used singly or in combination with an organoaluminum compound for the polymer production process of the present invention, such a combination is preferable from a viewpoint of an excellent polymerization activity.

Examples of the orgaoaluminum compound are those exemplified in the above catalyst component production process. The organoaluminum compound is used in an amount of usually 1 to 10,000 mol/mol, preferably 10 to 5,000 mol/mol, and more preferably 30 to 1,000 mol/mol, per one mol of the transition metal compound used in step (1) of the catalyst component production process.

Examples of a method for feeding the pre-polymerized catalyst component and organoaluminum compound to a polymerization reactor are (1) a method comprising a step of feeding the pre-polymerized catalyst component and organoaluminum compound separately to the polymerization reactor, and (2) a method comprising steps of (2-1) contacting the pre-polymerized catalyst component with the organoaluminum compound in a catalyst-preparing vessel, thereby forming a contact product, and then (2-2) feeding the contact product to the polymerization reactor.

An embodiment for feeding the pre-polymerized catalyst component and organoaluminum compound to the catalyst-preparing vessel or the polymerization reactor is not particularly limited. Examples of the embodiment are (1) feeding them thereto in their solid state, and (2) feeding them thereto in their solution, suspension or slurry state in a hydrocarbon solvent sufficiently free from compounds deactivating the catalyst component, such as water (moisture) and oxygen. Examples of the hydrocarbon solvent are an aliphatic hydrocarbon solvent such as butane, pentane, hexane, heptane and octane; an aromatic hydrocarbon solvent such as benzene and toluene; and a halogenated hydrocarbon solvent such as dichloromethane. Among them, preferred is an aliphatic hydrocarbon solvent or an aromatic hydrocarbon solvent, and more preferred is an aliphatic hydrocarbon solvent.

The polymer production process of the present invention is not particularly limited in its polymerization method. Examples of the polymerization method are (1) a gas-phase polymerization method performed in a gaseous monomer, (2) a solution polymerization method or slurry polymerization (suspension polymerization method) method performed in a polymerization solvent, and (3) a bulk polymerization method performed in a monomer as a solvent. Examples of the above polymerization solvent are an aliphatic hydrocarbon solvent such as butane, pentane, hexane, heptane and octane; an aromatic hydrocarbon solvent such as benzene and toluene; and a halogenated hydrocarbon solvent such as dichloromethane. The polymerization is carried out batch-wise or continuously, and may contain two or more polymerization steps different from one another in their polymerization conditions. Its polymerization time is generally determined depending on a condition such as a type of an olefin polymerized and a polymerization reactor, and is usually 1 minute to 20 hours.

The pre-polymerized catalyst component in the present invention can be particularly preferably applied to a polymerization method producing a particulate polymer, such as a slurry polymerization method, a gas-phase polymerization method, and a bulk polymerization method.

Such a slurry polymerization method can be performed by use of a conventional embodiment and polymerization condition. A preferable embodiment comprises steps of (1) feeding a monomer, a co-monomer, a diluent (for example, a solvent used for making a solution of an organoaluminum compound, which is fed to a polymerization reactor, and a solvent used for feeding a pre-polymerized catalyst component to a polymerization reactor), and other optionally-used compound (for example, a molecular weight regulator such as hydrogen to regulate a molecular weight of an addition polymer produced, and an inert gas), to a polymerization reactor continuously or intermittently, and (2) taking out a produced addition polymer slurry from the polymerization reactor continuously or intermittently. Examples of the polymerization reactor are (1) a loop reactor, (2) a stirrer-equipped reactor, and (3) a reactor composed of stirrer-equipped plural reactors connected with one other in series, in parallel, or in a combination thereof, those plural reactors being different from one another in their kind or in their polymerization reaction condition.

An example of the above diluent is an inert diluent (medium) such as paraffin, cycloparaffin and an aromatic hydrocarbon. The diluent, polymerization temperature and polymerization pressure are selected such that (1) a polymerization catalyst is maintained in a suspension state, (2) a diluent and at least a part of a monomer or co-monomer are maintained in a liquid phase, thereby the polymerization catalyst can be contacted with the monomer or co-monomer. The polymerization temperature, which can regulate a molecular weight of an addition polymer produced, is not particularly limited, provided that it is lower than a melting temperature of an addition polymer produced, and is generally about 0 to about 150° C., and preferably 30 to 100° C. The polymerization pressure is generally about 0.1 to about 10 MPa, and preferably 0.5 to 5 MPa.

The above gas-phase polymerization method can be performed by use of a polymerization method and condition known in the art. A gas-phase polymerization reactor is a fluidized bed reactor, preferably equipped with an enlarged part therein. The reactor may have an internal stirrer.

Examples of an embodiment for feeding the pre-polymerized catalyst component and organoaluminum compound to the polymerization reactor are (1) feeding them along with an inert gas (for example, nitrogen gas and argon gas), hydrogen or ethylene in a state free from moisture, and (2) feeding them in their solution or slurry state with a solvent.

The pre-polymerized catalyst component, orgaoaluminum compound, monomer, and co-monomer are fed to a polymerization reactor in any order, by a feeding method known in the art. Examples of the feeding method are (1) feeding them at the same time, and (2) feeding them sequentially. Also, a contact product formed by contacting the pre-polymerized catalyst component with the orgaoaluminum compound may be fed to the polymerization reactor.

Examples of a monomer used in the polymer production process of the present invention are an olefin having 2 to 20 carbon atoms; a diolefin; a cyclic olefin; an alkenyl aromatic hydrocarbon; a polar monomer; and a combination of two or more thereof. Specific examples thereof are an olefin such as ethylene, propylene, 1-butene, 1-pentene, 4-methyl-1-pentene, 5-methyl-1-hexene, 1-hexene, 1-heptene, 1-octene, 1-nonene, 1-decene and vinylcyclohexane; a diolefin such as 1,5-hexadiene, 1,4-hexadiene, 1,4-pentadiene, 1,7-octadiene, 1,8-nonadiene, 1,9-decadiene, 4-methyl-1,4-hexadiene, 5-methyl-1,4-hexadiene, 7-methyl-1,6-octadiene, 5-ethylidene-2-norbornene, dicyclopentadiene, 5-vinyl-2-norbornene, norbornadiene, 5-methylene-2-norbornene, 1,5-cyclooctadiene, 5,8-endomethylene hexahydronaphthalene, 1,3-butadiene, isoprene, 1,3-hexadiene, 1,3-octadiene, 1,3-cyclooctadiene and 1,3-cyclohexadiene; a cyclic olefin such as norbornene, 5-methylnorbornene, 5-ethylnorbornene, 5-butylnorbornene, 5-phenylnorbornene, 5-benzylnorbornene, tetracyclododecene, tricyclodecene, tricycloundecene, pentacyclopentadecene, pentacyclohexadecene, 8-methyltetracyclododecene, 8-ethyltetracyclododecene, 5-acetylnorbornene, 5-acetyloxynorbornene, 5-methoxycarbonylnorbornene, 5-ethoxycarbonylnorbornene, 5-methyl-5-methoxycarbonylnorbornene, 5-cyanonorbornene, 8-methoxycarbonyltetracyclododecene, 8-methyl-8-tetracyclododecene and 8-cyanotetracyclododecene; an alkenylaromatic hydrocarbon such as styrene, an alkenylbenzene (for example, 2-phenylpropylene, 2-phenylbutene and 3-phenylpropylene), an alkylstyrene (or example, p-methylstyrene, m-methylstyrene, o-methyl styrene, p-ethylstyrene, m-ethylstyrene, o-ethylstyrene, α-methylstyrene, 2,4-dimethylstyrene, 2,5-dimethylstyrene, 3,4-dimethylstyrene, 3,5-dimethylstyrene, 3-methyl-5-ethylstyrene, 1,1-diphenylethylene, p-tert-butylstyrene and p-sec-butylstyrene), a bisalkenylbenzene (for example, divinylbenzene), and an alkenylnaphthalene (for example, 1-vinylnaphthalene); and following polar monomers (1) to (6):

(1) an α,β-unsaturated carboxylic acid such as acrylic acid, methacrylic acid, fumaric acid, maleic anhydride, itaconic acid, itaconic anhydride and bicyclo(2,2,1)-5-heptene-2,3-dicarboxylic acid;

(2) a salt of the above α,β-unsaturated carboxylic acid and a metal (for example, sodium, potassium, lithium, zinc, magnesium and calcium);

(3) an α,β-unsaturated carboxylic acid ester such as methyl acrylate, ethyl acrylate, n-propyl acrylate, isopropyl acrylate, t-butyl acrylate, 2-ethylhexyl acrylate, methyl methacrylate, ethyl methacrylate, n-propyl methacrylate, isopropyl methacrylate, n-butyl methacrylate and isobutyl methacrylate;

(4) an unsaturated dicarboxylic acid such as maleic acid and itaconic acid;

(5) a vinyl ester such as vinyl acetate, vinyl propionate, vinyl caproate, vinyl caprate, vinyl laurate, vinyl stearate and vinyl trifluoroacetate; and (6) an unsaturated carboxylic acid glycidyl ester such as glycidyl acrylate, glycidyl methacrylate and itaconic acid mono-glycidyl ester.

Examples of the addition polymer produced by the polymer production process of the present invention are homopolymers of the above respective monomers, an ethylene-propylene copolymer, an ethylene-1-butene copolymer, an ethylene-1-hexene copolymer, an ethylene-1-octene copolymer, and a propylene-1-butene copolymer. The polymer production process of the present invention is preferable for producing an olefin polymer, and is particularly preferable for producing an ethylene-α-olefin copolymer using a monomer combination of ethylene with an α-olefin. Among them, preferred is a production of an ethylene-α-olefin copolymer having a polyethylene crystal structure, wherein the α-olefin is preferably an α-olefin having 3 to 8 carbon atoms such as 1-butene, 1-hexene and 1-octene.

According to the present invention, the above-mentioned fouling can be prevented even when pre-polymerization is performed continuously for a long time, which does not decrease efficiency of heat transfer of a polymerization reactor. Therefore, the pre-polymerization can be performed stably and continuously.

EXAMPLE

The present invention is explained in more detail with reference to the following Examples, which do not limit the present invention.

Example 1

1. Production of Modified Particle (Activation Agent)

A modified particle (activation agent) was produced according to a production method disclosed in JP 2009-79180A, Example 1, Sections (1) and (2) "catalyst component (A) for olefin polymerization". The obtained modified particle (activation agent) was found to contain 11% by weight of a zinc atom, and 6.4% by weight of a fluorine atom.

2. Production of Pre-Polymerized Catalyst Component

A 3 liter autoclave equipped with a stirrer was dried under reduced pressure, and was purged with nitrogen. The autoclave was evacuated, and then 480 g of butane (solvent) and 184 mg (345 μmol) of ethylenebis(indenyl)zirconium diphenoxide (transition metal compound) were put therein. The resultant mixture was stirred at 50° C. for 2 hours to dissolve the transition metal compound in the solvent, and then was cooled down to 30° C. To the autoclave, were added 1 g of ethylene (olefin monomer), 7.0 g of the above-produced modified particle (activation agent), and 0.056 mL (0.090 mmol) of a hexane solution (concentration: 1.6 mmol/mL) of n-butyllithium (organometallic compound), in this order, and the resultant mixture was stirred for 15 minutes. To the autoclave, was further added 1.3 mL (containing 1.3 mmol of triisobutylaluminum) of a hexane solution (concentration: 1.0 mmol/mL) of triisobutylaluminum (organoaluminum compound), thereby initiating pre-polymerization. The pre-polymerization was carried out at 30° C. for 30 minutes while supplying ethylene at a rate of 0.13 g/minute. The mixture was heated up to 50° C. over 30 minutes while supplying an ethylene/hydrogen mixed gas (containing 0.233% by mol of hydrogen) at a rate of 0.58 g/minute, and then was pre-polymerized at 50° C. for 3 hours. The monomer and butane were purged from the autoclave, thereby obtaining 105.8 g of a pre-polymerized catalyst component, corresponding to a degree of pre-polymerization of 15.1 g-pre-polymer/g-activation agent. There was found a very small amount of the pre-polymer adhering to the inside wall of the autoclave.

3. Production of Polymer

A 3 liter autoclave equipped with a stirrer was dried under reduced pressure, and was purged with argon. The autoclave was evacuated, and then hydrogen (partial pressure: 0.038 MPa), 55 g of 1-butene (monomer) and 695 g of butane were put therein, in this order, and then the resultant mixture was heated up to 70° C. Then, ethylene (monomer; partial pressure: 1.6 MPa) was added to the autoclave, thereby stabilizing the system. A gas in the system was found to contain 2.01% by mol of hydrogen and 3.37% by mol of 1-butene, measured by gas chromatograph analysis. To the autoclave, were added 1.5 mL of a hexane solution (concentration: 1 mmol/mL) of triisobutylaluminum (organoaluminum compound), 0.9 mL of a toluene solution (concentration: 0.1 mmol/mL) of triethylamine, and 160.2 mg of the above-produced pre-polymerized catalyst component, in this order, thereby initiating polymerization. The polymerization was carried out at 70° C. for 3 hours while feeding an ethylene/hydrogen mixed gas (containing 0.489% by mol of hydrogen) to keep a constant total pressure, thereby obtaining 37 g of an ethylene-1-butene copolymer, corresponding to a polymerization activity of 3,500 g-copolymer/g-activation agent.

The copolymer was found to have a short-chain branch number per 1,000 carbon atoms (SCB) of 14.0; a melt flow rate (MFR) of 0.93 g/10 minutes, a melt flow rate ratio (MFRR) of 85, and a swelling ratio (SR) of 1.40. Results are summarized in Table 1.

The above "zinc atom content" was measured by a method comprising steps of:
(1) adding a sample to a sulfuric acid aqueous solution (1 M), thereby preparing a sample solution;
(2) irradiating ultrasonic wave to the sample solution, thereby extracting a metal component: and
(3) determining a zinc atom content by ICP emission spectrometry.

The above "fluorine atom content" was measured by a method comprising steps of:
(1) burning a sample in a flask filled with oxygen;
(2) absorbing the combustion gas into a solution (concentration: 10%) containing sodium hydroxide; thereby obtaining a sample solution; and
(3) determining a fluorine atom content using the sample solution by an ion electrode method.

The above "SCB" is a content of a repeating unit derived from an α-olefin contained in an ethylene-α-olefin copolymer, and was measured as the number of a branch per 1,000 carbon atoms, with an infrared spectrophotometer, FT/IR-4200, manufactured by Japan Spectroscopic Co., Ltd., using a calibration curve based on characteristic absorptions of ethylene and the α-olefin.

The above "MFR" was measured according to JIS K7210-1995, at 190° C. under a load of 21.18 N (2.16 kg), using a sample copolymer containing 1,000 ppm of an antioxidant, above "JIS" being Japanese Industrial Standards.

The above "MFRR" was measured according to JIS K7210-1995, by dividing an MFR measured at 190° C. under a load of 211.82 N (21.60 kg) by an MFR measured at 190° C. under a load of 21.18 N (2.16 kg), using a sample copolymer containing 1,000 ppm of an antioxidant.

The above "SR" was measured by dividing a diameter of a strand obtained in the above MFR measurement by an inner diameter of a die (2.095 mm).

Example 2

1. Production of Pre-Polymerized Catalyst Component

Example 1 was repeated except that (1) 184 mg (345 μmol) of ethylenebis(indenyl)zirconium diphenoxide was changed to 182 mg (341 μmol) thereof, (2) 0.056 mL (0.090 mmol) of a hexane solution (concentration: 1.6 mmol/mL) of n-butyllithium was changed to 0.11 mL (0.18 mmol) thereof, (3) 1.3 mL (containing 1.3 mmol of triisobutylaluminum) of a hexane solution (concentration: 1.0 mmol/mL) of triisobutylaluminum was changed to 1.2 mL (containing 1.2 mmol of triisobutylaluminum) thereof, and (4) 7.0 g of the modified particle was changed to 7.1 g thereof, thereby obtaining 68.1 g of a pre-polymerized catalyst component, corresponding to a degree of pre-polymerization of 9.6 g-pre-polymer/g-activation agent. There was found no pre-polymer adhering to the inside wall of the autoclave.

2. Production of Polymer

Example 1 was repeated except that (1) a gas in the system was found to contain 1.83% by mol of hydrogen and 3.24% by mol of 1-butene, and (2) 160.2 mg of the pre-polymerized catalyst component was changed to 105.8 mg of the above-obtained pre-polymerized catalyst component, thereby obtaining 30 g of an ethylene-1-butene copolymer, corresponding to a polymerization activity of 2,700 g-copolymer/g-activation agent.

The copolymer was found to have an SCB of 14.6; an MFR of 0.97 g/10 minutes, an MFRR of 87, and a SR of 1.37. Results are summarized in Table 1.

Example 3

1. Production of Pre-Polymerized Catalyst Component

Example 1 was repeated except that (1) 184 mg (345 μmol) of ethylenebis(indenyl)zirconium diphenoxide was changed to 181 mg (339 μmol) thereof, (2) 0.056 mL (0.090 mmol) of a hexane solution (concentration: 1.6 mmol/mL) of n-butyllithium was changed to 0.22 mL (0.35 mmol) thereof, (3) 1.3 mL (containing 1.3 mmol of triisobutylaluminum) of a hexane solution (concentration: 1.0 mmol/mL) of triisobutylaluminum was changed to 1.1 mL (containing 1.1 mmol of triisobutylaluminum) thereof, and (4) the ethylene/hydrogen mixed gas (containing 0.233% by mol of hydrogen) was changed to an ethylene/hydrogen mixed gas (containing 0.189% by mol of hydrogen), thereby obtaining 82.9 g of a pre-polymerized catalyst component, corresponding to a degree of pre-polymerization of 11.8 g-pre-polymer/g-activation agent. There was found no pre-polymer adhering to the inside wall of the autoclave.

2. Production of Polymer

Example 1 was repeated except that (1) a gas in the system was found to contain 1.94% by mol of hydrogen and 3.20% by mol of 1-butene, (2) 160.2 mg of the pre-polymerized catalyst component was changed to 115.9 mg of the above-obtained pre-polymerized catalyst component, and (3) the ethylene/hydrogen mixed gas (containing 0.489% by mol of hydrogen) was changed to an ethylene/hydrogen mixed gas (containing 0.497% by mol of hydrogen), thereby obtaining 30 g of an ethylene-1-butene copolymer, corresponding to a polymerization activity of 2,400 g-copolymer/g-activation agent.

The copolymer was found to have an SCB of 14.0; an MFR of 1.0 g/10 minutes, an MFRR of 82, and a SR of 1.38. Results are summarized in Table 1.

Example 4

1. Production of Pre-Polymerized Catalyst Component

Example 1 was repeated except that (1) 184 mg (345 µmol) of ethylenebis(indenyl) zirconium diphenoxide was changed to 180 mg (337 µmol) thereof, (2) 0.056 mL (0.090 mmol) of a hexane solution (concentration: 1.6 mmol/mL) of n-butyllithium was changed to 0.44 mL (0.70 mmol) thereof, (3) 1.3 mL (containing 1.3 mmol of triisobutylaluminum) of a hexane solution (concentration: 1.0 mmol/mL) of triisobutylaluminum was changed to 1.1 mL (containing 1.1 mmol of triisobutylaluminum) thereof, and (4) 7.0 g of the modified particle was changed to 7.1 g thereof, thereby obtaining 78.5 g of a pre-polymerized catalyst component, corresponding to a degree of pre-polymerization of 11.1 g-pre-polymer/g-activation agent. There was found a small amount of the pre-polymer adhering to the inside wall of the autoclave.

2. Production of Polymer

Example 1 was repeated except that (1) a gas in the system was found to contain 1.96% by mol of hydrogen and 3.57% by mol of 1-butene, and (2) 160.2 mg of the pre-polymerized catalyst component was changed to 120.7 mg of the above-obtained pre-polymerized catalyst component, thereby obtaining 36 g of an ethylene-1-butene copolymer, corresponding to a polymerization activity of 3,300 g-copolymer/g-activation agent.

The copolymer was found to have an SCB of 14.6; an MFR of 0.97 g/10 minutes, an MFRR of 88, and a SR of 1.37. Results are summarized in Table 1.

Example 5

1. Production of Pre-Polymerized Catalyst Component

A 3 liter autoclave equipped with a stirrer was dried under reduced pressure, and was purged with argon. The autoclave was evacuated, and then 480 g of butane and 179 mg (335 µmol) of ethylenebis(indenyl)zirconium diphenoxide were put therein. The resultant mixture was stirred at 50° C. for 2 hours, and then, 0.22 mL (0.35 mmol) of a hexane solution (concentration: 1.6 mmol/mL) of n-butyllithium was added thereto. The mixture was cooled down to 30° C., and 1 g of ethylene and 7.1 g of the modified particle produced in Example 1 were added thereto, in this order. To the autoclave, was further added 1.1 mL (containing 1.1 mmol of triisobutylaluminum) of a hexane solution (concentration: 1.0 mmol/mL) of triisobutylaluminum, thereby initiating pre-polymerization. The pre-polymerization was carried out at 30° C. for 30 minutes while supplying ethylene at a rate of 0.13 g/minute. The mixture was heated up to 50° C. over 30 minutes while supplying an ethylene/hydrogen mixed gas (containing 0.212% by mol of hydrogen) at a rate of 0.58 g/minute, and then was pre-polymerized at 50° C. for 3 hours. The monomer and butane were purged from the autoclave, thereby obtaining 117.1 g of a pre-polymerized catalyst component, corresponding to a degree of pre-polymerization of 16.5 g-pre-polymer/g-activation agent. There was found no pre-polymer adhering to the inside wall of the autoclave.

2. Production of Polymer

Example 1 was repeated except that (1) a gas in the system was found to contain 2.05% by mol of hydrogen and 3.07% by mol of 1-butene, (2) 160.2 mg of the pre-polymerized catalyst component was changed to 160.3 mg of the above-obtained pre-polymerized catalyst component, and (3) the ethylene/hydrogen mixed gas (containing 0.489% by mol of hydrogen) was changed to an ethylene/hydrogen mixed gas (containing 0.525% by mol of hydrogen), thereby obtaining 63 g of an ethylene-1-butene copolymer, corresponding to a polymerization activity of 6,500 g-copolymer/g-activation agent.

The copolymer was found to have an SCB of 14.4; an MFR of 1.0 g/10 minutes, an MFRR of 83, and a SR of 1.38. Results are summarized in Table 1.

Example 6

1. Production of Pre-Polymerized Catalyst Component

A 3 liter autoclave equipped with a stirrer was dried under reduced pressure, and was purged with argon. The autoclave was evacuated, and then 480 g of butane and 0.22 mL (0.35 mmol) of a hexane solution (concentration: 1.6 mmol/mL) of n-butyllithium were put therein. Then, 183 mg (343 µmol) of ethylenebis(indenyl)zirconium diphenoxide was added thereto. The resultant mixture was stirred at 50° C. for 2 hours. The mixture was cooled down to 30° C., and 1 g of ethylene and 7.0 g of the modified particle produced in Example 1 were added thereto, in this order. To the autoclave, was further added 1.1 mL (containing 1.1 mmol of triisobutylaluminum) of a hexane solution (concentration: 1.0 mmol/mL) of triisobutylaluminum, thereby initiating pre-polymerization. The pre-polymerization was carried out at 30° C. for 30 minutes while supplying ethylene at a rate of 0.13 g/minute. The mixture was heated up to 50° C. over 30 minutes while supplying an ethylene/hydrogen mixed gas (containing 0.212% by mol of hydrogen) at a rate of 0.58 g/minute, and then was pre-polymerized at 50° C. for 3 hours. The monomer and butane were purged from the autoclave, thereby obtaining 123.8 g of a pre-polymerized catalyst component, corresponding to a degree of pre-polymerization of 17.7 g-pre-polymer/g-activation agent. There was found no pre-polymer adhering to the inside wall of the autoclave.

2. Production of Polymer

Example 1 was repeated except that (1) a gas in the system was found to contain 1.97% by mol of hydrogen and 3.44% by mol of 1-butene, (2) 160.2 mg of the pre-polymerized catalyst component was changed to 186.0 mg of the above-obtained pre-polymerized catalyst component, and (3) the ethylene/hydrogen mixed gas (containing 0.489% by mol of hydrogen) was changed to an ethylene/hydrogen mixed gas (containing 0.525% by mol of hydrogen), thereby obtaining 61 g of an ethylene-1-butene copolymer, corresponding to a polymerization activity of 5,800 g-copolymer/g-activation agent.

The copolymer was found to have an SCB of 14.7; an MFR of 2.0 g/10 minutes, an MFRR of 66, and a SR of 1.48. Results are summarized in Table 1.

Example 7

1. Production of Pre-Polymerized Catalyst Component

Example 1 was repeated except that (1) 184 mg (345 mmol) of ethylenebis(indenyl)zirconium diphenoxide was changed to 182 mg (341 μmol) thereof, (2) 0.056 mL (0.090 mmol) of a hexane solution (concentration: 1.6 mmol/mL) of n-butyllithium was changed to 0.22 mL (0.35 mmol) of a hexane solution (concentration: 1.6 mmol/mL) of tert-butyllithium, and (3) 1.3 mL (containing 1.3 mmol of triisobutylaluminum) of a hexane solution (concentration: 1.0 mmol/mL) of triisobutylaluminum was changed to 1.1 mL (containing 1.1 mmol of triisobutylaluminum) thereof, thereby obtaining 131.3 g of a pre-polymerized catalyst component, corresponding to a degree of pre-polymerization of 18.5 g-pre-polymer/g-activation agent. There was found no pre-polymer adhering to the inside wall of the autoclave.

2. Production of Polymer

Example 1 was repeated except that (1) a gas in the system was found to contain 2.02% by mol of hydrogen and 3.88% by mol of 1-butene, and (2) 160.2 mg of the pre-polymerized catalyst component was changed to 185.8 mg of the above-obtained pre-polymerized catalyst component, thereby obtaining 12 g of an ethylene-1-butene copolymer, corresponding to a polymerization activity of 1,200 g-copolymer/g-activation agent.

The copolymer was found to have an SCB of 13.7; an MFR of 0.94 g/10 minutes, an MFRR of 86, and a SR of 1.38. Results are summarized in Table 1.

Example 8

1. Production of Pre-Polymerized Catalyst Component

Example 1 was repeated except that (1) 184 mg (345 μmol) of ethylenebis(indenyl) zirconium diphenoxide was changed to 193 mg (362 μmol) thereof, (2) 0.056 mL (0.090 mmol) of a hexane solution (concentration: 1.6 mmol/mL) of n-butyllithium was changed to 0.22 mL (0.35 mmol) of a hexane solution (concentration: 1.6 mmol/mL) of ethyllithium, and (3) 1.3 mL (containing 1.3 mmol of triisobutylaluminum) of a hexane solution (concentration: 1.0 mmol/mL) of triisobutylaluminum was changed to 1.1 mL (containing 1.1 mmol of triisobutylaluminum) thereof, thereby obtaining 67.5 g of a pre-polymerized catalyst component, corresponding to a degree of pre-polymerization of 9.6 g-pre-polymer/g-activation agent. There was found no pre-polymer adhering to the inside wall of the autoclave.

2. Production of Polymer

Example 1 was repeated except that (1) a gas in the system was found to contain 1.97% by mol of hydrogen and 3.64% by mol of 1-butene, and (2) 160.2 mg of the pre-polymerized catalyst component was changed to 100.1 mg of the above-obtained pre-polymerized catalyst component, thereby obtaining 24 g of an ethylene-1-butene copolymer, corresponding to a polymerization activity of 2,300 g-copolymer/g-activation agent.

The copolymer was found to have an SCB of 13.4; an MFR of 0.75 g/10 minutes, an MFRR of 107, and a SR of 1.33. Results are summarized in Table 1.

Comparative Example 1

1. Production of Pre-Polymerized Catalyst Component

Example 1 was repeated except that (1) 184 mg (345 μmol) of ethylenebis(indenyl) zirconium diphenoxide was changed to 195 mg (365 μmol) thereof, (2) the hexane solution of n-butyllithium was not used, and (3) 1.3 mL (containing 1.3 mmol of triisobutylaluminum) of a hexane solution (concentration: 1.0 mmol/mL) of triisobutylaluminum was changed to 1.4 mL (containing 1.4 mmol of triisobutylaluminum) thereof, thereby obtaining 100.2 g of a pre-polymerized catalyst component, corresponding to a degree of pre-polymerization of 14.3 g-pre-polymer/g-activation agent. The inside wall of the autoclave was covered all over with a thin layer of a pre-polymer.

2. Production of Polymer

Example 1 was repeated except that (1) a gas in the system was found to contain 1.90% by mol of hydrogen and 3.74% by mol of 1-butene, and (2) 160.2 mg of the pre-polymerized catalyst component was changed to 153.0 mg of the above-obtained pre-polymerized catalyst component, thereby obtaining 35 g of an ethylene-1-butene copolymer, corresponding to a polymerization activity of 3,300 g-copolymer/g-activation agent.

The copolymer was found to have an SCB of 13.8; an MFR of 1.1 g/10 minutes, an MFRR of 81, and a SR of 1.43. Results are summarized in Table 1.

TABLE 1

| | Example | | | | | | | | Comparative Example 1 |
|---|---|---|---|---|---|---|---|---|---|
| | 1 | 2 | 3 | 4 | 5 | 6 | 7 | 8 | |
| Pre-polymerization*[1] | | | | | | | | | |
| Organometallic compound used | | | | | | | | | none |
| n-Butyllithium (mmol) | 0.09 | 0.18 | 0.35 | 0.70 | 0.35 | 0.35 | 0.35 | | |
| Ethyllithium (mmol) | | | | | | | | 0.35 | |
| Organoaluminum compound used | | | | | | | | | |
| Triisobutylaluminum (mmol) | 1.3 | 1.2 | 1.1 | 1.1 | 1.1 | 1.1 | 1.1 | 1.1 | 1.4 |
| Adhesion state of pre-polymer*[2] | B | A | A | B | A | A | A | A | C |
| Main polymerization | | | | | | | | | |
| Activity (g/g) | 3,500 | 2,700 | 2,400 | 3,300 | 6,500 | 5,800 | 1,200 | 2,300 | 3,300 |
| SCB | 14.0 | 14.6 | 14.0 | 14.6 | 14.4 | 14.7 | 13.7 | 13.4 | 13.8 |
| MFR (g/10 minutes) | 0.93 | 0.97 | 1.0 | 0.97 | 1.0 | 2.0 | 0.94 | 0.75 | 1.1 |
| MFRR | 85 | 87 | 82 | 88 | 83 | 66 | 86 | 107 | 81 |
| SR | 1.40 | 1.37 | 1.38 | 1.37 | 1.38 | 1.48 | 1.38 | 1.33 | 1.43 |

*[1]The transition metal compound, modified particle, organometallic compound and organoaluminum compound were added to the autoclave in the following order:
Examples 1-4, 7 and 8
transition metal compound → modified particle → organometallic compound → organoaluminum compound
Examples 5
transition metal compound → organometallic compound → modified particle → organoaluminum compound
Examples 6
organometallic compound → transition metal compound → modified particle → organoaluminum compound
Comparative Examples 1
transition metal compound → modified particle → organoaluminum compound
*[2]A, B and C mean as follows, respectively:
A: There was found no pre-polymer adhering to the inside wall of the autoclave;
B: There was found a small amount of the pre-polymer adhering to the inside wall of the autoclave; and
C: The inside wall of the autoclave was covered all over with a thin layer of a pre-polymer.

The invention claimed is:

1. A process for producing a pre-polymerized catalyst component for addition polymerization, comprising steps of:
   (1) contacting a transition metal compound represented by following formula [1], or a μ-oxo type dimmer of the transition metal compound, an activation agent, an organometallic compound represented by following formula [2], and an optional organoaluminum compound with one another; thereby forming a primary polymerization catalyst; and
   (2) pre-polymerizing an olefin in the presence of the primary polymerization catalyst;

$$L^1{}_a M^1 X^1{}_b \qquad [1]$$

wherein $M^1$ is a transition metal atom of group 4 in the periodic table; $L^1$ is a cyclopentadiene-containing anionic group or a hetero atom-containing group, and when two $L^1$s exsist, they may be linked to each other, directly or through a linking group containing a carbon, silicon, nitrogen, oxygen, sulfur or phosphorus atom; $X^1$ is a halogen atom, a hydrocarbyloxy group, or a hydrocarbyl group other than the above cyclopentadiene-containing anionic group; a is a number satisfying $0<a\leqq 3$; and b is a number satisfying $0<b\leqq 3$;

$$M^2 L^2{}_m \qquad [2]$$

wherein $M^2$ is a typical metal atom of group 1 or 2 in the periodic table; $L^2$ is a hydrogen atom, a halogen atom, a hydrocarbyl group, or a hydrocarbyloxy group; and m is a valence of $M^2$.

2. The process according to claim 1, wherein step (1) comprises steps of (1-1) contacting the transition metal compound represented by formula [1], or a μ-oxo type dimmer of the transition metal compound with the organometallic compound represented by formula [2], thereby forming a contact product, and (1-2) contacting the contact product with the activation agent.

3. The process according to claim 1, wherein step (1) comprises steps of (1-1) contacting the transition metal compound represented by formula [1], or a μ-oxo type dimmer of the transition metal compound with the organometallic compound represented by formula [2], thereby forming a first contact product, (1-2) contacting the first contact product with the activation agent, thereby forming a second contact product, and (1-3) contacting the second contact product with the organoaluminum compound.

4. The process according to claim 1, wherein $M^2$ is a typical metal atom of group 1 in the periodic table.

5. The process according to claim 1, wherein the activation agent is a modified particle produced by a process comprising a step of contacting a compound (a) represented by following formula [3], a compound (b) represented by following formula [4], a compound (c) represented by following formula [5], and a particulate inorganic oxide (d) or a particulate organic polymer (d), with one another:

$$M^3 L^3{}_2 \qquad [3]$$

$$R^1{}_{t-1} TH \qquad [4]$$

$$R^2{}_{t-2} TH_2 \qquad [5]$$

wherein $M^3$ is a typical metal atom of group 12 in the periodic table (revised edition of IUPAC Inorganic Chemistry Nomenclature 1989); $L^3$ is a hydrogen atom, a halogen atom or a hydrocarbyl group, and plural $L^3$s are the same as, or different from one another; $R^1$ is an electron-withdrawing group, or a group containing an electron-withdrawing group, and plural $R^1$s are the same as, or different from one another; $R^2$ is a hydrocarbyl group or a halogenated hydrocarbyl group; two Ts are independently of each other an atom of group 15 or 16 in the periodic table (revised edition of IUPAC Inorganic Chemistry Nomenclature 1989); and t is a valence of T.

6. The process according to claim 1, wherein step (1) comprises a step of contacting the transition metal compound represented by formula [1], or a μ-oxo type dimmer of the transition metal compound, the activation agent, the organometallic compound represented by formula [2], and the organoaluminum compound with one another.

7. A process for producing an addition polymer, comprising a step of polymerizing an addition polymerizable monomer in the presence of a pre-polymerized catalyst component for addition polymerization produced by the process of claim 1, or in the presence of the pre-polymerized catalyst component and an organoaluminum compound.

8. The process according to claim 7, wherein the addition polymerizable monomer is a combination of ethylene with an α-olefin.

* * * * *